(12) United States Patent
Fukushima et al.

(10) Patent No.: US 7,010,373 B2
(45) Date of Patent: Mar. 7, 2006

(54) PARTS PRODUCTION SCHEDULING METHOD

(75) Inventors: Yasunobu Fukushima, Sayama (JP); Hiroshi Kobayashi, Sayama (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 11/179,156

(22) Filed: Jul. 12, 2005

(65) Prior Publication Data
US 2006/0015203 A1    Jan. 19, 2006

(30) Foreign Application Priority Data
Jul. 14, 2004    (JP) .............................. 2004-207460

(51) Int. Cl.
*G06F 19/00* (2006.01)
(52) U.S. Cl. ..................................... 700/100; 700/106
(58) Field of Classification Search .................. 700/99, 700/100, 101, 102, 103, 104, 106, 107, 215, 700/223, 224
See application file for complete search history.

(56) References Cited

U.S. PATENT DOCUMENTS 5,983,195 A * 11/1999 Fierro .......................... 705/10
6,801,821 B1 * 10/2004 Madden et al. ............. 700/101
6,813,539 B1 * 11/2004 Morimoto et al. .......... 700/215

FOREIGN PATENT DOCUMENTS

| JP | 10-156648 | 6/1998 |
| JP | 10-263994 | 10/1998 |

* cited by examiner

*Primary Examiner*—Leo Picard
*Assistant Examiner*—Zoila Cabrera
(74) *Attorney, Agent, or Firm*—Hamre, Schumann, Mueller & Larson, P.C.

(57) ABSTRACT

A parts production scheduling method is provided for preparing, after receipt of a production order schedule of finished vehicles, a production order schedule of parts necessary for the production of the finished vehicles, wherein the production order schedule of the parts, which is divided into plural zones each equivalent to production of a predetermined number of consecutive products in the product order schedule of the higher products, is shifted so that it is ahead of the production order schedule of the higher products by one zone, thereafter, for each zone, parts to be produced on a parts production line are converted into corresponding pieces of parts identification information registered in advance, and the converted pieces of parts identification information are sorted by pre-registered inter-parts similarity information and collated with pre-registered part-by-part production order pattern information.

10 Claims, 21 Drawing Sheets

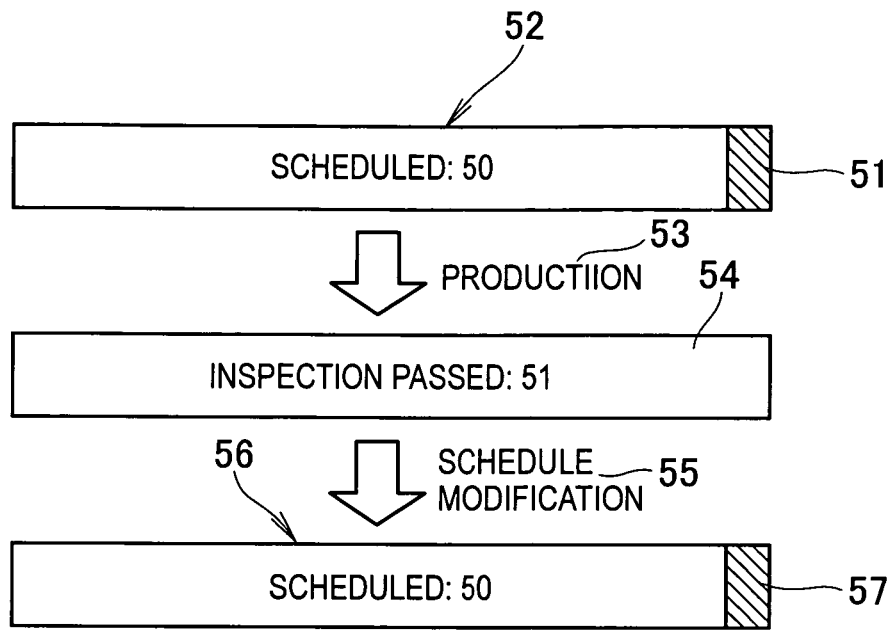

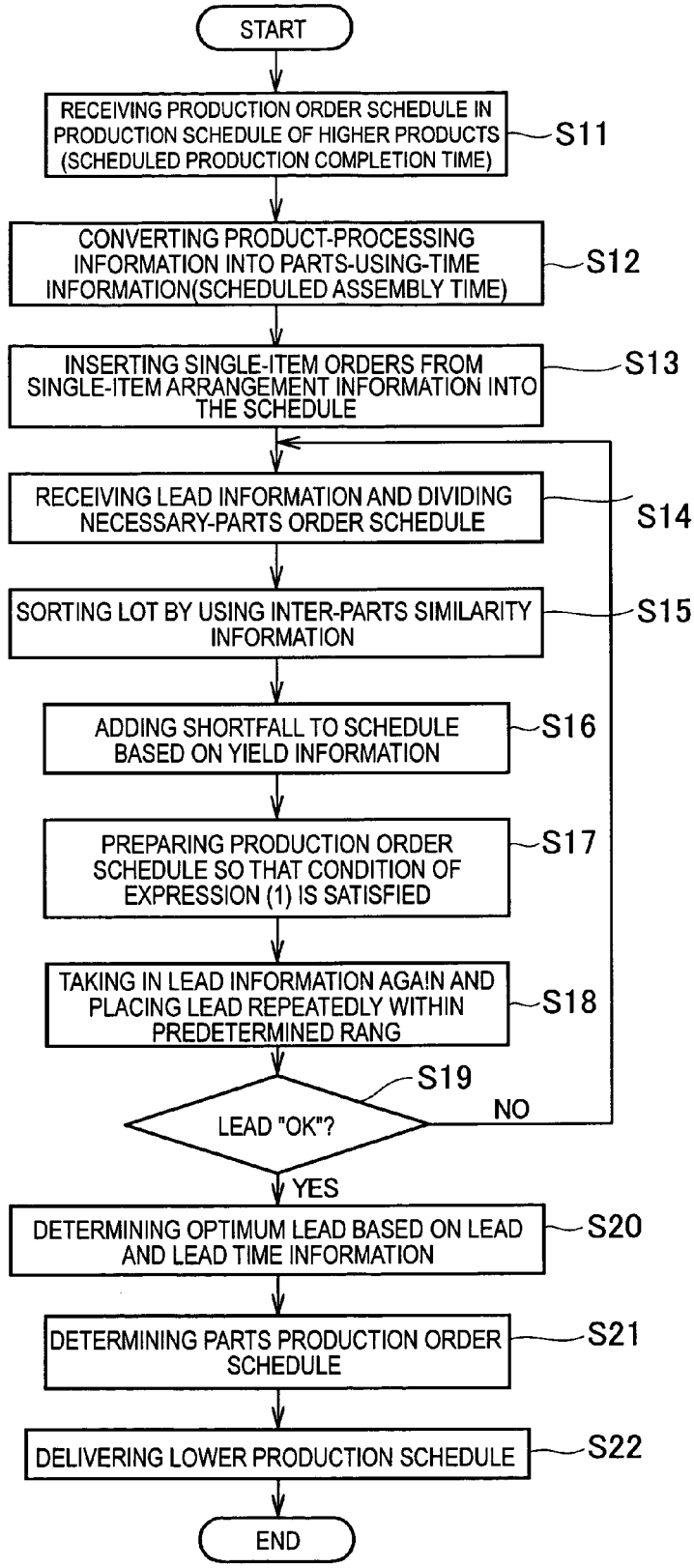

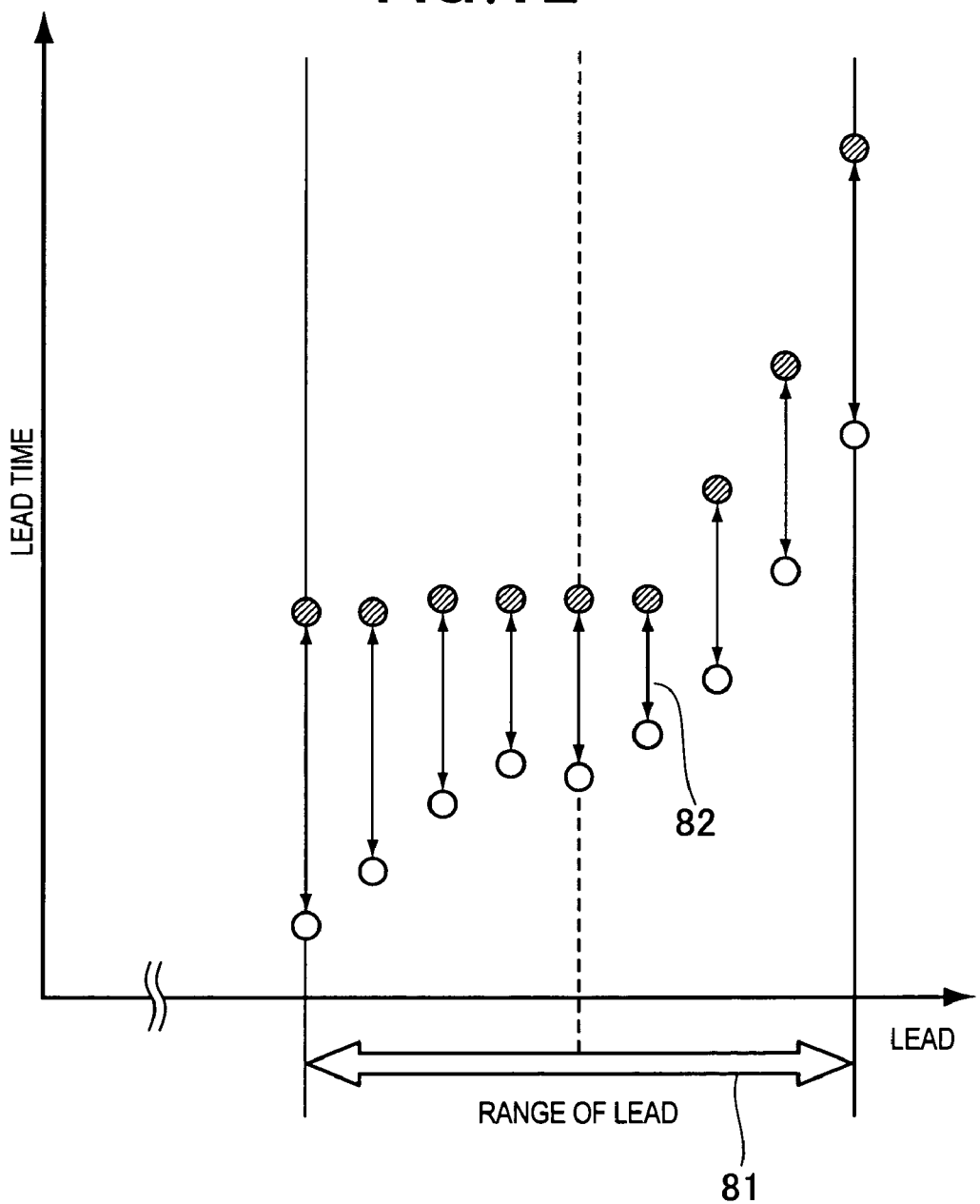

FIG.13

| FRAME NO. | COLOR | DESTINATION | SPECIFICATION | TYPE |
|---|---|---|---|---|
| F01 | RED | DOMESTIC | 4WD | ACCORD WAGON |
| F02 | RED | | | |
| F03 | RED | | | |
| F04 | BLACK | | | |
| F05 | BLACK | | | |
| F06 | SILVER | EXPORT RH | | |
| F07 | SILVER | | | |
| F08 | SILVER | | | |
| F09 | SILVER | | | |
| F10 | BLUE | | | |
| F11 | BLUE | EXPORT LH | | |
| F12 | BLUE | | | |
| F13 | BLUE | | | |
| F14 | BLUE | | | |
| F15 | BLACK | | | |
| F16 | BLACK | EXPORT LH | 2WD | |
| F17 | RED | | | |
| F18 | RED | | | |
| F19 | SILVER | | | |
| F20 | SILVER | | | |
| F21 | RED | EXPORT RH | | |
| F22 | RED | | | |
| F23 | BLACK | | | |
| F24 | BLACK | | | |
| F25 | BLACK | | | |
| F26 | BLACK | DOMESTIC | | |
| F27 | BLUE | | | |
| F28 | BLUE | | | |
| F29 | BLACK | | | |
| F30 | SILVER | | | |
| F31 | SILVER | DOMESTIC | 2WD | ACCORD |
| F32 | SILVER | | | |
| F33 | WHITE | | | |
| F34 | WHITE | | | |
| F35 | WHITE | | | |
| F36 | WHITE | EXPORT RH | | |
| F37 | SILVER | | | |
| F38 | SILVER | | | |
| F39 | SILVER | | | |
| F40 | SILVER | | | |
| F41 | RED | EXPORT LH | | |
| F42 | RED | | | |
| F43 | BLACK | | | |
| F44 | BLACK | | | |
| F45 | BLACK | | | |
| F46 | BLACK | EXPORT LH | 4WD | |
| F47 | BLUE | | | |
| F48 | BLUE | | | |
| F49 | BLUE | | | |
| F50 | SILVER | | | |
| F51 | SILVER | EXPORT RH | | |
| F52 | SILVER | | | |
| F53 | SILVER | | | |
| F54 | WHITE | | | |
| F55 | WHITE | | | |
| F56 | WHITE | DOMESTIC | | |
| F57 | SILVER | | | |
| F58 | SILVER | | | |
| F59 | SILVER | | | |
| F60 | RED | | | |

COLOR
- ▨ : RED
- ▧ : BLACK
- ▩ : SILVER
- ▤ : BLUE
- ☐ : WHITE

FIG.14

| TYPE | SPECIFICATION | DESTINATION | COLOR | BUMPER PARTS CODE |
|---|---|---|---|---|
| ACCORD WAGON | 4WD | DOMESTIC | RED | AA-RE |
| | | | BLACK | AA-BK |
| | | | BLUE | AA-BL |
| | | | SILVER | AA-SL |
| | | EXPORT RH | RED | AA-RE |
| | | | BLACK | AA-BK |
| | | | BLUE | AA-BL |
| | | | SILVER | AA-SL |
| | | EXPORT LH | RED | AA-RE |
| | | | BLACK | AA-BK |
| | | | BLUE | AA-BL |
| | | | SILVER | AA-SL |
| | 2WD | EXPORT LH | RED | AA-RE |
| | | | BLACK | AA-BK |
| | | | BLUE | AA-BL |
| | | | SILVER | AA-SL |
| | | EXPORT RH | RED | AA-RE |
| | | | BLACK | AA-BK |
| | | | BLUE | AA-BL |
| | | | SILVER | AA-SL |
| | | DOMESTIC | RED | AA-RE |
| | | | BLACK | AA-BK |
| | | | BLUE | AA-BL |
| | | | SILVER | AA-SL |
| ACCORD | 2WD | DOMESTIC | RED | AB-RE |
| | | | BLACK | AB-BK |
| | | | BLUE | AB-BL |
| | | | SILVER | AB-SL |
| | | | GREEN | AB-GR |
| | | | WHITE | AB-WH |
| | | EXPORT RH | RED | AB-RE |
| | | | BLACK | AB-BK |
| | | | BLUE | AB-BL |
| | | | SILVER | AB-SL |
| | | | GREEN | AB-GR |
| | | | WHITE | AB-WH |
| | | EXPORT LH | RED | AB-RE |
| | | | BLACK | AB-BK |
| | | | BLUE | AB-BL |
| | | | SILVER | AB-SL |
| | | | GREEN | AB-GR |
| | | | WHITE | AB-WH |
| | | EXPORT LH | RED | AC-RE |
| | | | BLACK | AC-BK |
| | | | BLUE | AC-BL |
| | | | SILVER | AC-SL |
| | | | GREEN | AC-GR |
| | | | WHITE | AC-WH |
| | 4WD | EXPORT RH | RED | AC-RE |
| | | | BLACK | AC-BK |
| | | | BLUE | AC-BL |
| | | | SILVER | AC-SL |
| | | | GREEN | AC-GR |
| | | | WHITE | AC-WH |
| | | DOMESTIC | RED | AC-RE |
| | | | BLACK | AC-BK |
| | | | BLUE | AC-BL |
| | | | SILVER | AC-SL |
| | | | GREEN | AC-GR |
| | | | WHITE | AC-WH |

COLOR:
- RED
- BLACK
- SILVER
- BLUE
- WHITE
- GREEN

FIG.16

| BUMPER S/N | BUMPER PARTS CODE | VEHICLE S/N |
|---|---|---|
| B01 | AA-RE | F01 |
| B02 | AA-RE | F02 |
| B03 | AA-RE | F03 |
| B04 | AA-RE | F17 |
| B05 | AA-RE | F18 |
| B06 | AA-BK | F04 |
| B07 | AA-BK | F05 |
| B08 | AA-BK | F06 |
| B09 | AA-BK | F15 |
| B10 | AA-BK | F16 |
| B11 | AA-BL | F10 |
| B12 | AA-BL | F11 |
| B13 | AA-BL | F12 |
| B04 | AA-BL | F13 |
| B15 | AA-BL | F14 |
| B16 | AA-SL | F07 |
| B17 | AA-SL | F08 |
| B18 | AA-SL | F09 |
| B19 | AA-SL | F19 |
| B20 | AA-SL | F20 |

FIG. 17A

| BUMPER PARTS CODE | AA-RE | AA-BK | AA-BL | AA-SL | AB-RE | AB-BK | AB-BL | AB-SL | AC-RE | AC-BK | AC-BL | AC-SL |
|---|---|---|---|---|---|---|---|---|---|---|---|---|
| AA-RE |  | ◎ | ◎ | ◎ | O | O | O | O | × | × | × | × |
| AA-BK |  |  | ◎ | ◎ | O | O | O | O | × | × | × | × |
| AA-BL |  |  |  | ◎ | O | O | O | O | × | × | × | × |
| AA-SL |  |  |  |  | O | O | O | O | × | × | × | × |
| AB-RE |  |  |  |  |  | O | O | O | × | × | × | × |
| AB-BK |  |  |  |  |  |  | O | O | × | × | × | × |
| AB-BL |  |  |  |  |  |  |  | O | × | × | × | × |
| AB-SL |  |  |  |  |  |  |  |  | × | ◎ | × | × |
| AC-RE |  |  |  |  |  |  |  |  |  |  | ◎ | ◎ |
| AC-BK |  |  |  |  |  |  |  |  |  |  | ◎ | ◎ |
| AC-BL |  |  |  |  |  |  |  |  |  |  |  | ◎ |
| AC-SL |  |  |  |  |  |  |  |  |  |  |  |  |

FIG.17B

PRODUCTION ORDER PATTERN (1) SHAPE PRIORITY

| SHAPE | PIORITY = 1 | PIORITY = 2 |
|---|---|---|
| AA | 1 | 3 |
| AB | 2 | 2 |
| AC | 3 | 1 |

(2) COLOR PRIORITY PATTERN "A"

| BUMPER PARTS CODE | PIORITY = 1 | PIORITY = 2 |
|---|---|---|
| AA-RE | 1 | 4 |
| AA-BK | 2 | 3 |
| AA-BL | 3 | 2 |
| AA-SL | 4 | 1 |

(3) COLOR PRIORITY PATTERN "B"

| BUMPER PARTS CODE | PIORITY = 1 | PIORITY = 2 |
|---|---|---|
| AB-RE | 1 | 6 |
| AB-BK | 2 | 5 |
| AB-BL | 3 | 4 |
| AB-SL | 5 | 2 |
| AB-GR | 4 | 3 |
| AB-WH | 6 | 1 |

(4) COLOR PRIORITY PATTERN "C"

| BUMPER PARTS CODE | PIORITY = 1 | PIORITY = 2 |
|---|---|---|
| AC-RE | 1 | 6 |
| AC-BK | 2 | 5 |
| AC-BL | 3 | 4 |
| AC-SL | 5 | 2 |
| AC-GR | 4 | 3 |
| AC-WH | 6 | 1 |

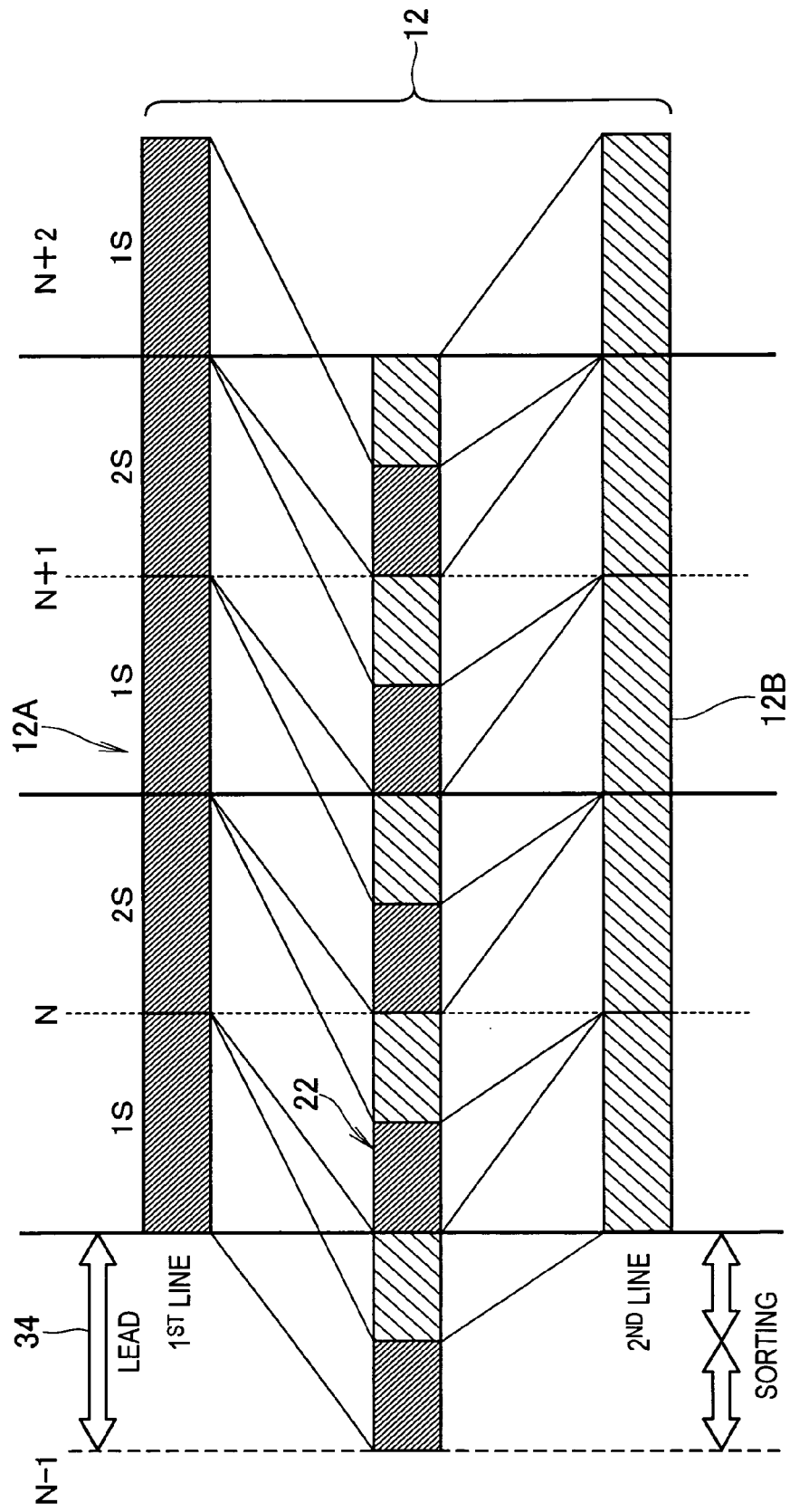

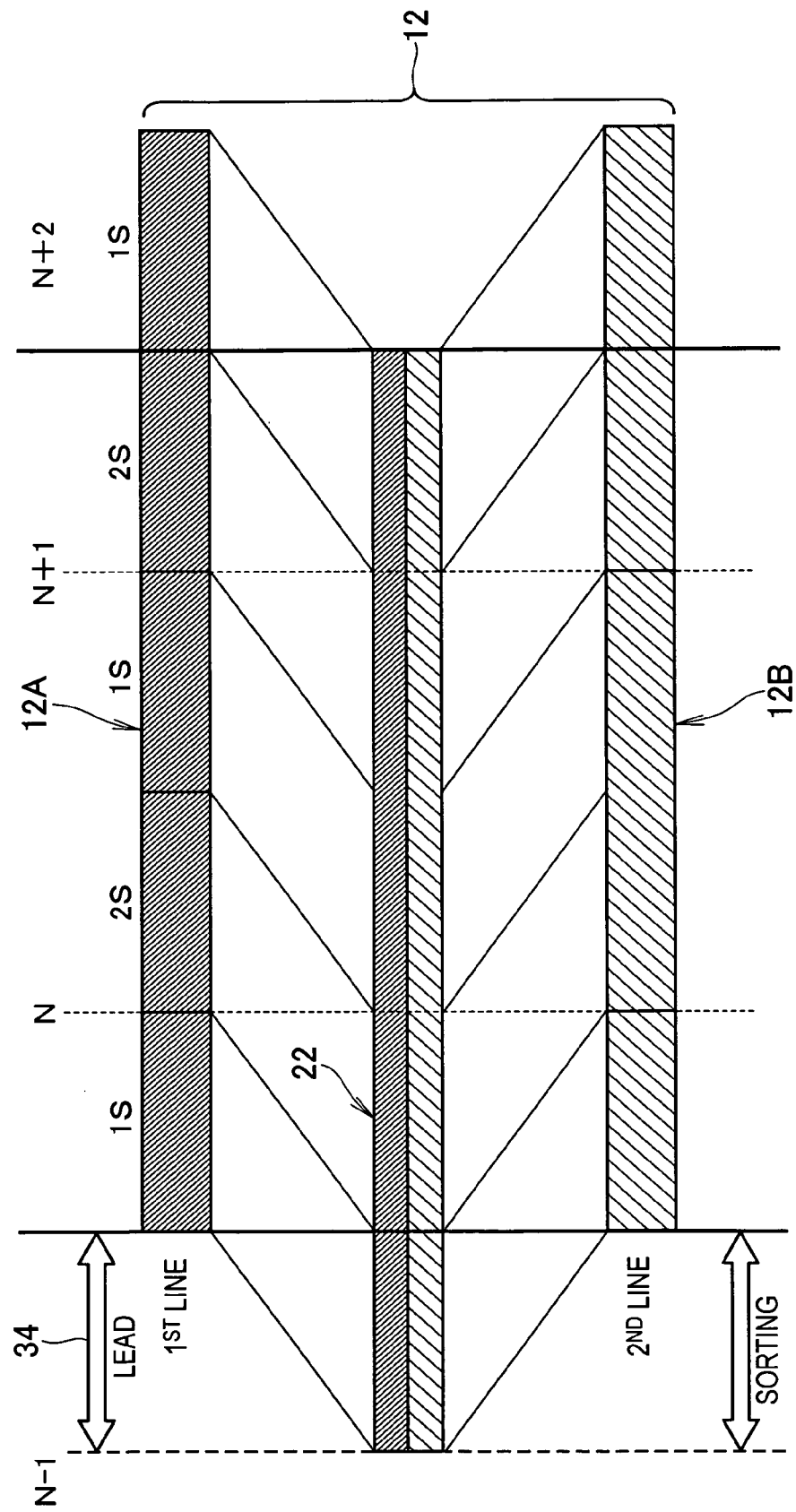

PARTS PRODUCTION SCHEDULING METHOD

FIELD OF THE INVENTION

The present invention relates generally to production scheduling methods for parts, and more particularly to a parts production scheduling method so configured as to produce an optimum amount of parts on a parts production line in a parts factory and supply them, while keeping an optimum amount of stocks, to a product production line in a product plant where products such as finished motor vehicles are produced.

BACKGROUND OF THE INVENTION

In a product plant for producing finished products such as motor vehicles, necessary parts are supplied by the necessary quantities and at the necessary times to a line side of a production line in accordance with a production schedule of the finished products. FIG. 20 hereof shows the basic idea of a known parts supply system used for replenishing parts to the line side of a production line for producing finished products. The finished products have a higher priority than the parts so that the final products are hereinafter referred to for brevity as "higher products".

In a diagram shown in FIG. 20 the horizontal axis represents time and the vertical axis represents the inventory quantity of a certain part. The inventory quantity is equal to a number of parts to be replenished to and stocked at the line side of the production line. In FIG. 20, numeral 101 denotes a polygonal line showing variations in the inventory quantity; 102, a parts delivery lead time; 103, an order point (time); and 104, an order quantity. The regular inventory level is set to be 30. The order point is determined by the regular inventory level.

The inventory quantity is kept not to fall below the regular inventory level. To this end, an order point 103 is estimated by calculation based on an estimated amount of use of the parts (slope of the polygonal line 101) and the parts delivery lead time 102 (time taken from the order to the delivery of the parts). When an actual inventory level falls below the inventory level at the estimated order point 103, an order in the desired quantity 104 is issued for replenishment. With this parts replenishment, it is possible to prevent the actual inventory level from falling below the regular inventory level. The order quantity of the parts varies with time. At a time immediately after the delivery of parts has completed, the inventory quantity becomes equal to the sum of the actual inventory quantity and the order quantity and a corresponding quantity of parts remains standing on at the line side of the production line. The inventory quantity should preferably be as small as possible. However, since the actual inventory quantity varies with variations in the part delivery lead time 102 and variations in the quantity of parts used, it is a conventional practice to give a tolerance to the regular inventory level.

FIG. 21 hereof is a graph showing changes in the inventory quantity evidenced when the parts replenishment is executed according to a synchronized delivery system generally called "kanban" system. In FIG. 21, the horizontal axis represents time, and the vertical axis represents inventory quantity. The inventory quantity is divided into two designated by a "first box" and a "second box", respectively. A regular inventory level, which determines an order point, is set to be 30. Numeral 202 denotes a lead time; 203, a delivery quantity equivalent to an inventory quantity held in the first box. According to the kanban system, control of each type of parts is performed on a parts box basis. In the case of the illustrated kanban system, two boxes of inventory are provided at the line side of the production line. As the assembly of products proceeds, a first box becomes empty whereupon a "kanban" is removed from the empty first box and returned to a relevant parts supplier. The parts supplier then starts to produce a predetermined quantity of parts of the same type as specified in the removed "kanban". The produced parts are received in a new box and after the "kanban" is attached to the box, the box holding therein the predetermined amount of produced parts is delivered to the product plant.

In this instance, however, if the production of the part at the parts supplier (parts factory) is started after receipt of the "kanban", the part delivery lead time becomes longer. To deal with this problem, the parts supplier produces the parts in advance and keeps them in stock. The stocked parts are allotted to shipping. The shipping of the stocked parts is treated as a trigger to start producing the parts. The thus triggered production of the parts continues until the produced parts replenish a shortage of inventory caused due to shipment to the production plant.

In this instance if a time required for the production of the parts is shorter than a time that the next order (removed "kanban") from the product plant takes before its arrival to the parts supplier, the replenishment of the shortage will complete in time. If this is not the case, the parts production process is subdivided so as to provide in-process inventory. The quantity of good-in-progress and the number of "kanbans" used in and between the product plant and the part factory vary greatly depending on the number of "kanbans" used in the parts production line for each unit time.

The "kanban" system operates to tuning or optimization of the respective types of parts by properly setting the number of "kanbans" used and the quantity of goods-in-progress. Thus, once the tuning completes, the "kanban" system does not accept the order quantity per unit time varying widely; if not so the "kanban" system does not operate appropriately. The "kanban" system requires leveling of production schedules used for producing products in the production plant.

FIG. 22 hereof diagrammatically shows another conventional parts production schedule preparing method, wherein in order to ensure that the necessary parts for assembly with finished products can be produced and supplied n accordance with a production order schedule of the finished products, a working time required for production of parts on a part production line and a delivery time required for the delivery of the parts from a part factory to a production plant are calculated, and by calculating back from the product production order schedule, a production schedule of the parts is prepared. In FIG. 22 numeral 401 denotes the production order schedule of products X and Y and numeral 402 denotes a production order schedule of parts Wx and Wy. The parts production order schedule 402 is determined in accordance with the product production order schedule 401. According to the disclosed method, each time the type of products to be produced in accordance with the product production order schedule 401, a setup change should be incorporated in the parts production order schedule 402. Accordingly, if the parts specification varies widely depending on the type of the parts, the number of setup change increases correspondingly, which is time-consuming and may cause a problem that the production of the necessary parts does not complete in time. On the other hand, according to this method, the necessary parts are produced at the necessary times, there are remarkable few pats inventories remaining at the line side of the product production line.

Further examples of conventional parts production scheduling method are disclosed in Japanese Patent Laid-open Publications (JP-A) Nos. 10-156648 and 10-263994. Stated more specifically, JP-A-10-156648 discloses a method of automatically preparing a production schedule with due consideration of the delivery order and time of each type of parts to an assembly line based on a production schedule of the assembly line. On the other hand, JP-A-10-263994 discloses a method of preparing a parts production schedule on the basis of a vehicle body production schedule. According to the disclosed method, based on the premise that parts stock or inventory is provided, an investigation is achieved to determine whether or not the supply of all parts required is in time. When some sorts of parts are found not to be available by the assembly start time, the production schedule is elaborated again so that among those sorts of parts found to be available by the assembly start time, such a sort of parts having an ample amount of time to be used for assembly with the vehicle body is chosen and the production of such sort of parts is postponed.

The conventional parts production scheduling methods discussed above encounter various problems as summarized below.

The conventional scheduling methods are based on the premise that stock or inventory is provided by estimation for each type of parts. This tends to increase a total inventory quantity and requires a large inventory space. Furthermore, the production of a wide variety of parts in a separate manner on the parts production line is low in efficiency. It is therefore highly desirable that the parts be sorted by type to gather or collect parts of the same type in a lot, thereby equalizing or leveling the production load. However, the greater the parts lot size, the longer the lead time before the assembly of the parts with the products begins. This will results in an increased inventory quantity. Conversely, if the parts lot size is reduced, the setup time will increase due to an increased number of die/tool change operation at respective processing stage as well as color change operation in the painting process. In the case where a dedicated program is developed, a problem arises that the dedicated program cannot be readily applied to a process having a different condition. Furthermore, when limiting conditions for its own process are changed, the dedicated program requires a tedious and time-consuming effort for modification thereof.

SUMMARY OF THE INVENTION

It is accordingly an object of the present invention to provide a parts production schedule preparing method, which when used with the production of parts on a parts production line in a parts factory and delivery of the parts to a product production line in a product plant where products of higher priority, i.e., higher products such as finished vehicles are produced, is capable of setting the inventory quantity optimally without causing undue increase, is able to equalize or level the production loads, ensures the supply of an optimal number of parts at the optimum time to the product production line, and allows easy modification of the limiting conditions for the parts production line.

According to the invention, there is provided a parts production scheduling method for preparing a production order schedule of parts necessary for the production of higher products after receipt of a production order schedule of the higher products, comprising the steps of: pre-registering parts identification information, inter-parts similarity information, and part-by-part production order pattern information; dividing the production order schedule of the parts into plural zones each equivalent to production of a predetermined number of consecutive products in the product order schedule of the higher products; shifting the production order schedule of the parts so that the production order schedule of the parts is ahead of the production order schedule of the higher products by one zone; for each zone of the production order schedule of the parts, converting parts to be produced on a parts production line into corresponding pieces of information of the pre-registered parts identification information; and for each zone of the production order schedule of the parts, sorting the converted pieces of parts identification information by the pre-registered inter-parts similarity information and collating the converted pieces of parts identification information with the pre-registered part-by-part production order pattern information.

According to the parts production scheduling method of the invention, the production order schedule of the parts, which corresponds to the production order schedule of the higher products, is divided into plural zones each equivalent to production of a predetermined number of consecutive higher products, which is determined by a lead. The parts production order schedule is executed ahead of the product production order schedule by a time corresponding to one of the divided zones. Between the preceding zone of the part production order schedule and the following zone of the product production order schedule, the frame number of each individual product and the serial number of a corresponding one part are coordinated with each other. With this coordination, the individual products to be produced on the product production line and the parts to be produced on the parts production line for assembly with the corresponding products are accurately tied with each other.

The predetermined number of products is preferably represented by a numeric value variable within a predetermined range and set in advance as representing a lead of the production order schedule of the parts relative to the production order schedule of the higher products.

The parts production scheduling method may further comprise the step of correcting the numeric value on the basis of actual production data collected on the parts production line.

Preferably, the parts production scheduling method further comprises the step of upwardly revising the production order schedule of the parts on the basis of actual percent defective information collected for each type of parts.

The parts production scheduling method may further comprise the step of revising a production schedule of each type of parts on the basis of actual production data about production-scheduled parts or expected defective parts.

The production order schedule of the parts is applicable to a production order schedule of parts to be ordered on a type-by-type basis in conjunction with the production order schedule of the higher products.

Preferably, the production order schedule of the parts is so prepared as to satisfy the condition represented by Expression:

$$Z \times (\text{product takt time}) \geq Z \times (\text{parts takt time}) + M \times (\text{setup time})$$

where Z represents the number of higher products in each of the divided zones, and M represents the number of types of the parts sorted in each of the divided zones.

The parts production scheduling method may further comprise the step of calculating, on the basis of the production order schedule of the parts, a float slack time between the end of production of each part and the beginning of assembly of the same part into a corresponding one of the higher products and issuing a warning with respect to a part having a relatively short float slack time.

In one preferred form of the invention, the part production line is linked in operation with at least two product production lines such that the part production line produces, in a first half of each of the divided zones, those parts to be used with higher products produced on one of the at least two product production lines, and in a second half of the same divided zone, those parts to be used with higher products produced on another product production line.

In another preferred form of the invention, the part production line is linked in operation with at least two product production lines such that the part production line produces, in each of the divided zones, first parts and second parts in a mixed condition, for use with first higher products and second higher products, respectively, produced on one of the at least two product production lines and second higher products produced on another product production line.

BRIEF DESCRIPTION OF THE DRAWINGS

Certain preferred structural embodiments of the present invention will be described in detail herein below, by way of example only, with the reference to the accompanying drawings, in which:

FIG. 7 is a view diagrammatically illustrating the manner in which a production involving parts replenishment is prepared and revised when necessary;

FIG. 8 is a correlation diagram used for determining the correlation between different types of parts when a wide variety of parts are to be produced;

FIG. 11 is a flowchart showing a sequence of steps achieved to carry out the bumper production scheduling method;

FIG. 12 is a diagram showing the relationship between the width of lead and the lead time;

FIG. 13 is a chart showing a finished vehicle production schedule at certain times of a given day that is prepared in connection with the production of bumpers;

FIG. 14 is a chart showing bumper parts codes each determined by a combination of the type, specification, destination and color of the vehicle;

FIG. 16 is a chart showing the relationship between the frame number and the bumper serial number, which ties the finished vehicle (product) and the bumper (part);

FIG. 17A is a chart showing the similarity between bumpers of different parts codes;

FIG. 17B shows various charts registered in advance to provide priority with respect to the shapes and colors of the bumpers.

FIG. 18 is a diagrammatical view showing the relationship between two product production lines and a single part production line according to one embodiment of the invention;

FIG. 19 is a diagrammatical view showing the relationship between two product production lines and a single parts production line according to another embodiment of the present invention;

DETAILED DESCRIPTION OF THE PREFERRED EMBODIMENTS

Figure 1:
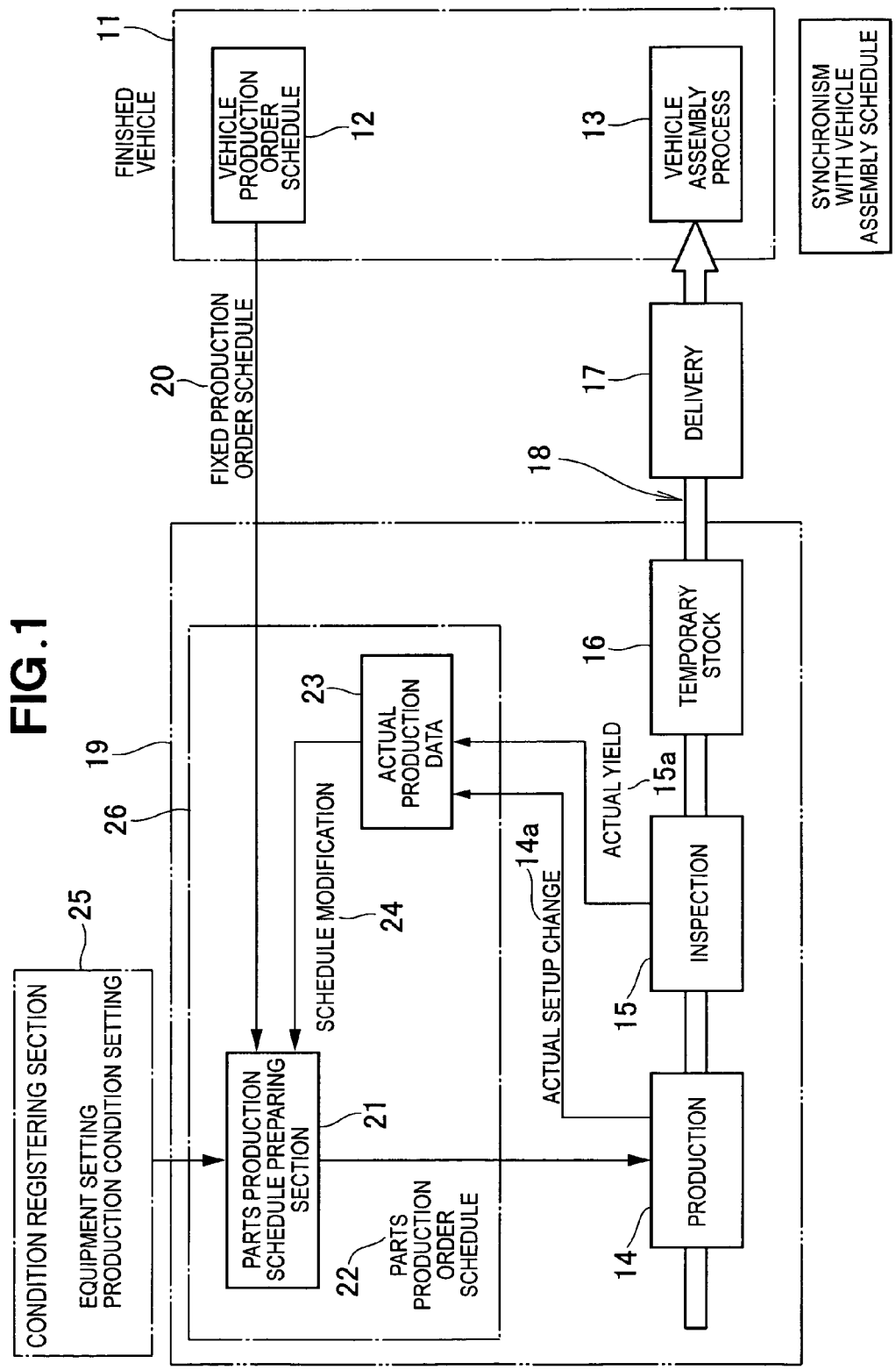
FIG. 1 is a block diagram showing a general configuration of a production system to which a parts production scheduling method of the present invention is applied.

Referring now to the drawings and FIG. 1 in particular, there is shown in block diagram a general configuration of a production system to which a parts production scheduling method according to the present invention is applied. The production system is arranged to produce motor vehicles (finished vehicles) as an example of finished products (hereinafter referred to as "higher products"). The production system generally comprises a finished vehicle production system for producing finished vehicles, and a parts production and supply system for producing and supplying parts for assembly in the finished vehicles. The parts are, for example, inter-factory manufacturing parts that are produced in a parts factory of a car manufacturer itself.

As shown in FIG. 1, the production system includes a production area 11 for finished vehicles, which is essentially formed by a finished vehicle production plant. The finished vehicle production area 11 is provided with a vehicle production order schedule 12 in advance. The finished vehicle production area 11 also includes a vehicle assembly process 13, which is carried out by a product production line (vehicle production line). In the vehicle assembly process 13, products to be assembled are processed into finished vehicles according to the vehicle production order schedule 12 while they are fed on and along the product production line. The vehicle assembly process 13 and the vehicle production order schedule 12 are synchronized with each other so that a flow of the assembled vehicles on the product production line is determined in accordance with the vehicle production order schedule 12.

The product production line used for carrying out the vehicle assembly process 13 has a line side to which those pasts, which are required in each individual assembly stage (at a corresponding parts assembly section), are supplied in the needed quantity. Numeral 18 shown in FIG. 1 denotes a parts production and supply process, which includes in succession a production stage 14 in a production section, an inspection stage 15 in an inspection section, a temporary stock stage 16 in a temporary stock section, and a delivery stage 17 in a delivery section. The parts production and supply process 18 produces and supplies a necessary quantity of parts to each individual assembly stage on the product production line in the vehicle assembly process 13. The part production and supply process 18 is essentially determined according to the vehicle production order schedule 12 that is provided for the finished vehicles.

A parts production area (parts production system) 19, which is essentially formed by a parts production factory, is located near the finished vehicle production plant 11. The parts production area 19 is provided for production of each kind of parts and includes a parts production control or management block 26.

In the parts production area 19, a parts production schedule preparing section 21 prepares a parts production order schedule 22 by using information about a fixed production order schedule 20 as primary information with the premise that the vehicle production order schedule 12 in the finished vehicle production area 11 has been fixed. The production stage 14 performs necessary processing operations to produce a desired part in accordance with the parts production order schedule 22. The production stage 14 comprises a parts production line on which the necessary processing operations are carried out.

The preparation of the parts production order schedule 22 at the parts production schedule preparing section 21 includes a process of performing a correction. The correction is performed based on actual production data 23, which are collected, for example, about actual setup changes 14$a$ occurring during the course of production at the production stage 14 and actual yield 15$a$ indicative of a pass rate of finished parts at the inspection stage 15. The correction is applied, for example, to a lead in the part production order schedule. The parts production order schedule can thus be modified or revised when necessary (schedule modification 24).

The parts produced at the production stage 14 are then inspected at the inspection stage 15. Inspected and passed parts are temporarily stocked at the temporary stock stage 16 from which they are delivered to a predetermined line side of the product production line in the vehicle assembly process 13 for assembly in a finished vehicle in accordance with the vehicle production order schedule 12.

The parts production schedule preparing section 21 is supplied with data about various other conditions or requirements, such as equipment setting, production condition setting and so on, which are provided from a condition registering section 25 for use in the preparation of the parts production schedule.

Figure 2:
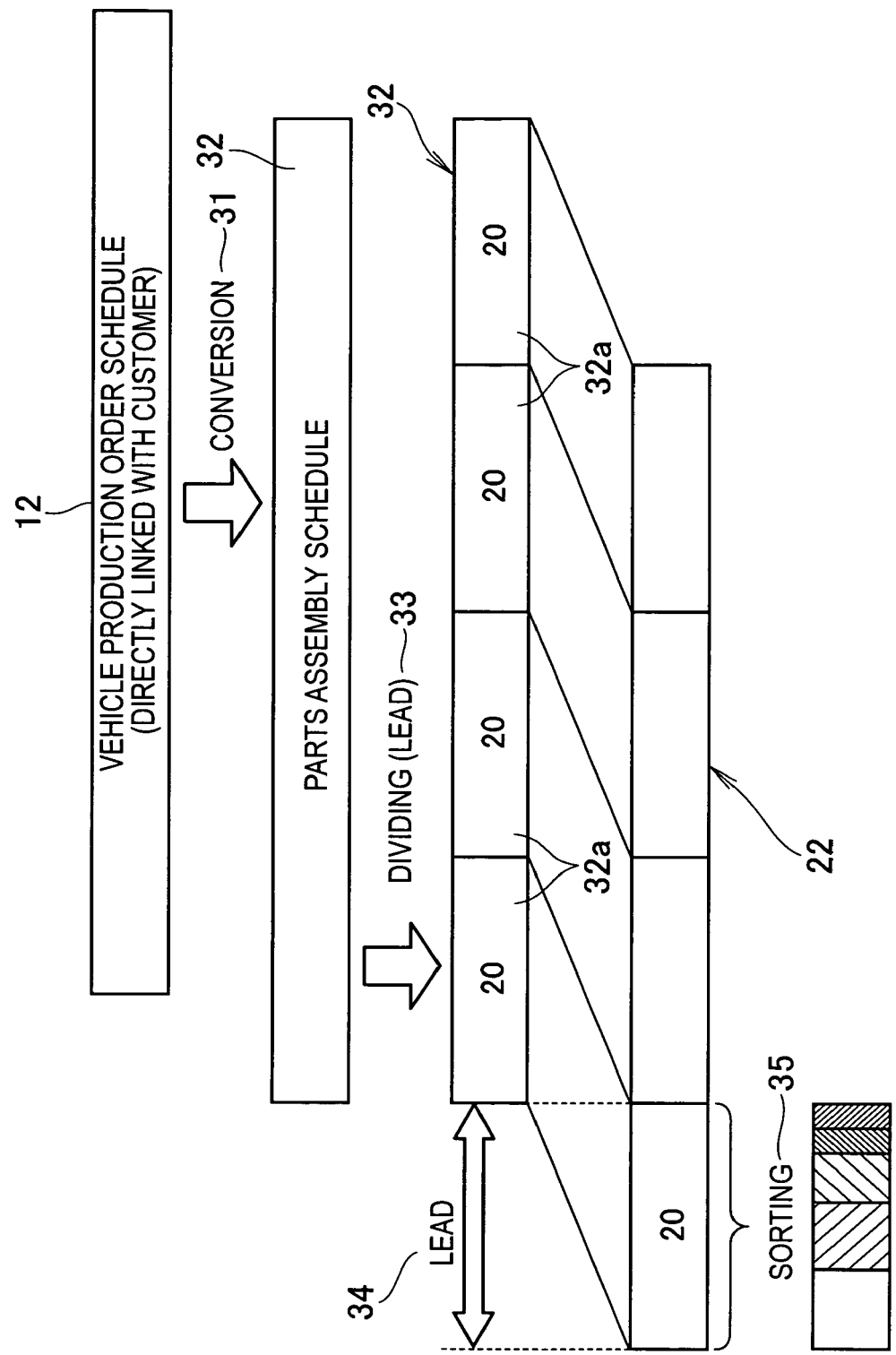
FIG. 2 is a view diagrammatically illustrating the manner in which a part production schedule is prepared according to the invention.

Referring next to FIG. 2, steps of a parts production schedule preparation procedure achieved by the parts production schedule preparing section 21 will be described.

At first, the vehicle production order schedule 12 for finished vehicles is received as a fixed schedule (fixed production order schedule 20) from a higher system, which controls the production of a wide variety of finished vehicles. The vehicle production order schedule 12 is usually prepared to provide a time at which production of a finished vehicle completes and the finished vehicle is shipped from the production plant. The thus prepared vehicle production order schedule 12 cannot be used for the preparation of a parts production schedule unless it is modified appropriately. Additionally, since the production order is in direct reliance on the demands from individual customers, all the products being processed do not always have the same specification concerning the exterior color, for example. In view of this, the respective specifications of finished vehicles are converted into specifications of parts and, based on this conversion, the vehicle production order schedule 12 is converted into a schedule prepared to provide a time when each part is actually assembled in a finished vehicle (conversion step 31). With this conversion, a parts assembly schedule 32 is prepared, which schedule represents a time schedule for assembly of the parts into the finished vehicles.

The parts assembly schedule 32 is then divided into plural parts or areas 32$a$ by a predetermined number of vehicles as a lot to be produced ahead (dividing step 33). The predetermined number of vehicles corresponds to a "lead" (number of vehicles in unit lot) 34 shown in FIG. 2. The predetermined number used in the dividing step 32 to divide the part assembly schedule 32 is equal to 20, for example. In the illustrated embodiment, four divided areas 32$a$ each prepared for twenty vehicles as a lot are arranged in succession. Subsequently, in each divided area 32$a$, products of similar specifications are gathered or collected by sorting by color (sorting step 35) so that various conditions or requirements input for the parts production and supply process 18 are fulfilled. Examples of such conditions include the number of color changes to be less than a predetermined reference value, the lead time to be provided with a sufficient margin, and the current or floating stock to be as small as possible. With this sorting, the aforementioned parts production order schedule 22 is prepared.

The parts production scheduling method of the present invention can be carried out in various forms such as exemplified in FIGS. 3 to 6. In FIGS. 3–6 four parts production scheduling methods according a corresponding number of embodiments are shown in tabulated form with row headings of "product production schedule", "sorting", "parts production schedule", and "parts inventory variations", and with column headings of "zone N−1", "zone N", and "zone N+1" arranged in succession along a horizontal time axis. The product production schedule represents a product production order or sequence determined according to the vehicle production order schedule 12 (FIGS. 1 and 2). The sorting represents grouping or sorting the vehicles by the type thereof. The parts production schedule represents a number and a sequence of parts to be produced in accordance with the parts production order schedule 22 (FIGS. 1 and 2). The parts inventory variations represent variations in the parts inventory or stock. The unit of time is a minute.

In the embodiments shown in FIGS. 3–6, products (finished vehicles) to which parts are to be assembled are produced on the product production line at a predetermined production rate (one for each unit time) under the condition that two different types of vehicles A and B are present concurrently. The production order of the products A, B achieved on the product production line is determined depending on the priority of delivery to the customers. Thus the product production order, namely the product production schedule cannot be changed. For these types of products (finished vehicles) A and B, parts are supplied. As for the parts, these parts $C_A$, $C_B$, which differ in specification from one another according to the types of products A, B, are supplied for assembly with the corresponding type of vehicles in accordance with the part production schedule. In this instance, it is assumed that the parts production and supply process 18 (FIG. 1) can produce two parts for one minute (i.e., one part for 0.5 minute) and requires two minutes for setup change from one kind of parts $C_A$ to the other kind $C_B$ and vise versa.

According to the parts production scheduling method of the present invention, parts are produced efficiently with the use of only one parts production line and with due consideration of an actual parts production time and the necessary setup change time (i.e., two minutes). For such efficient parts production, the product production schedule is divided at regular intervals of time (required for the production of a predetermined number of products Z as one lot). The time intervals correspond to the aforementioned zones (N−1), N and (N+1). For each zone, the products are sorted or grouped depending on the type M of product. In this case, Z, which represents a number of products to be produced, is determined such that the condition represented by Expression (1) below is satisfied:

$$Z \times (\text{product takt time}) \geq Z \times (\text{parts takt time}) + M \times (\text{setup time}) \quad (1)$$

It will be appreciated from Expression (1) that if Expression (1) is satisfied and production of the parts is started with a lead time equal to Z×(product takt time) being taken relative to the parts assembly schedule 32 (FIG. 2), a necessary number of parts can undoubtedly be produced before the necessary time which is set for assembly of each part to a corresponding one of the products finished vehicles).

Figure 3:
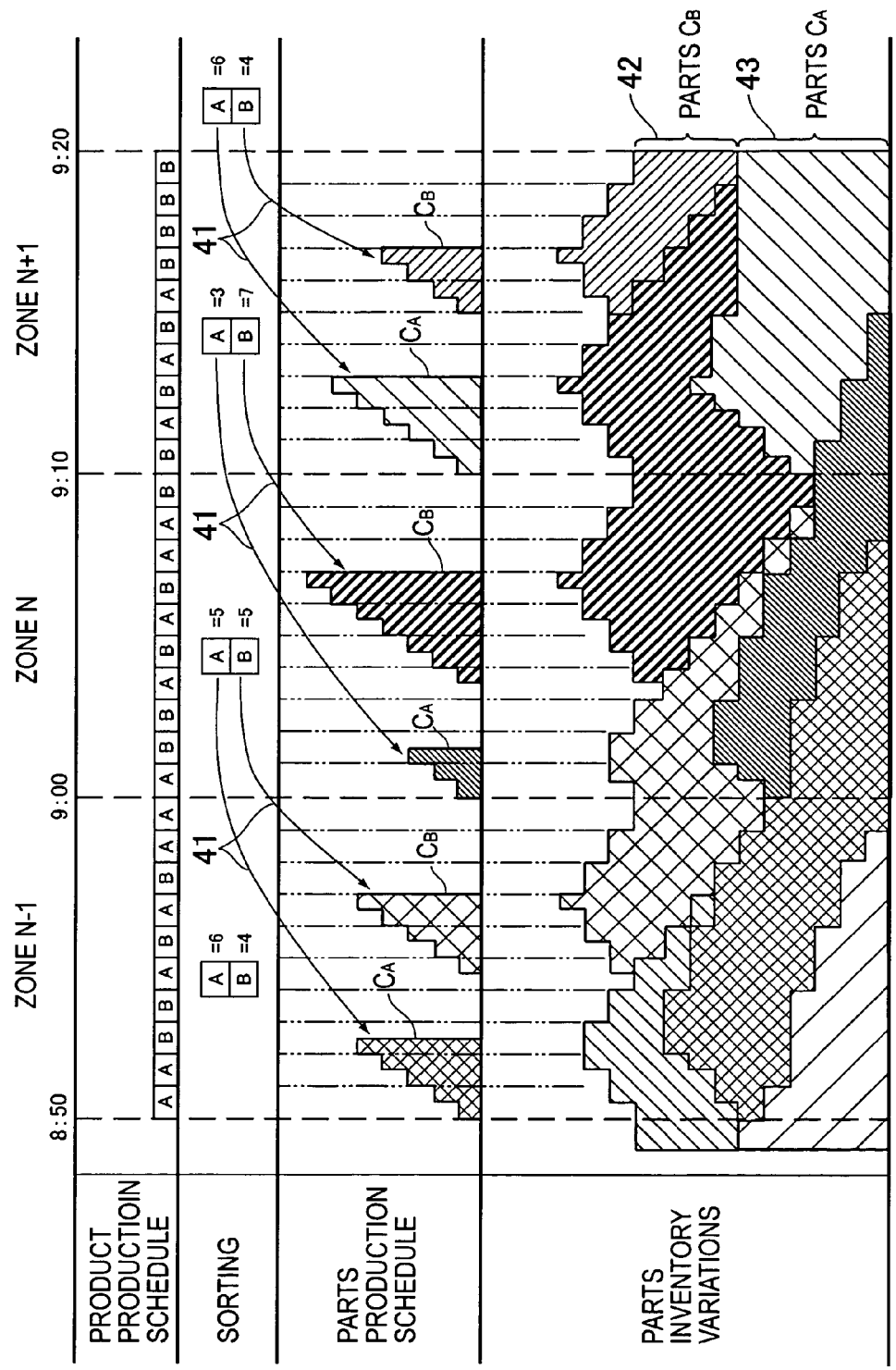
FIG. 3 is a view diagrammatically showing a parts production scheduling method according to a first embodiment of the present invention.

In the product production schedule shown in FIG. 3, each divided zone N−1, N, N+1 includes 10 products as a lot. In this case, Expression (1) can be expressed as: 10×(1.0 min.)≥10×(0.5 min.)+2×(2.0 min.) so that the condition represented by Expression (1) is satisfied. As for the zone N, five A-type products and five B-type products are present concurrently. The products in the zone N are sorted depending on the type as shown in the row heading "sorting". And, as for the parts scheduled for use in assembly in the zone N, production is started at 8:50, which is 10 minutes ahead of 9:00 from which assembly of the same parts into 10 products (finished vehicles) in the zone N is started.

As understood from the parts production schedule shown in FIG. 3, production of the parts $C_A$ is started at 8:50 and continues until five parts are produced. Thereafter, setup change is started at 8:52:30 and ends at 8:54:30 from which production of the parts $C_B$ is started. Production of five parts $C_B$ completes at 8:57 and, thereafter, setup change is carried out in preparation for the production of the parts $C_B$ in the next zone N+1. The setup change requires two minutes and hence ends at 8:59.

Arrows 41 shown in pairs in FIG. 3 as extending between the two adjacent rows "sorting" and "parts production schedule" are used to indicate a relationship (or linkage) between the number of products A, B to be produced in each zone N−1, N or N+1 and the parts production schedule executed on a single part production line. Based on this relationship, one can readily understand at which time and in what number the parts should be produced on the parts production line in connection with the production of various types of products on the product production line.

From the part stock changes shown in FIG. 3 we can determine a total number of parts being in stock and changes 42, 43 in the stock of the parts $C_A$ and $C_B$. The total parts stock shows slight fluctuations about a central value equal to Z (10 in the illustrated embodiment), which represents a number of parts produced ahead of the production of the corresponding lot of products. At the time points 8:50, 9:00 and 9:10, where the adjacent zones are separated, the total parts stock is equal to 10. During the setup change, the total part stock tends to dip from 10. It is also understood that these parts, which are produced in advance in the zone N−1, are completely used in the next succeeding zone N. As for the zone N, both parts $C_A$ and $C_B$ have a certain amount of stocks, however, these parts $C_A$, $C_B$ in stock are prepared for production of the product in the next zone N+1. This means that the parts produced in the preceding zone N−1 are completely used in zone N and the stock in the same zone N is not an extra stock but scheduled for assembly in the next succeeding zone N+1.

The parts production scheduling method of the invention will be described in further detail below using an expression formula: C(N, [M, L]) where C: the part's name, N: zone name, M: type of product, and L: ordinal number indicative of production order. For instance, C(N−1, [B, 1]) means that a part C that is the first part to be produced in zone N−1 for assembly in a type-B product (finished vehicle). As shown in FIG. 3, production of a part represented by the formula C(N−1, [B, 1]) completes at 8:55 and the produced part is assembled in a first type-B product in zone N at 9:01. Thus, a lead time of 6 minutes (9:01–8:55) is available. As for a part represented by the formula C(N−1, [A, 1]), production ends at 8:50:30 and the produced part is assembled in the first type-A product in zone N at 9:00. A lead time available in this case is 9 minutes and 30 seconds (9:00–8:50:30). Similarly, in the case of a part represented by the formula C(N−1, [A, 5]), production completes at 8:52:30 and the produced part is assembled in the fifth type-A product in zone N at 9:08. Thus, a 15-minutes-and-30-seconds lead time (9:08–8:52:30) is available. As for a product represented by the formula C(N−1, [B, 5]), production completes at 8:57 and the produced part is used for assembly in the fifth type-B product in zone N at 9.09, so that an available lead time is 12 minutes (9:09–8:57).

By executing the same arithmetic operation for all of the parts to be produced, it is possible to determine leads represented by the number of parts) or lead times for the individual parts with respect to their production, delivery and assembly with the corresponding products. Production of parts with small leads (or short lead times) may affect the production of final products (finished vehicles) when a defective part occurs. Thus the lead (or lead time) constitutes an important control factor for the production of the parts and the products assembled therewith.

The first embodiment shown in FIG. 3 is advantageous in that only those parts, which are already scheduled for use in the products (finished vehicles), are produced and, hence, no extra stock is produced. On the other hand, a defect that may occur on the part production line would directly cause a parts shortage problem. To deal with this problem, actual production data 23 (FIG. 1) are collected for each type of parts so that the part production schedule for each parts type can be upwardly revised according to a percent defective of the parts of the relevant type.

In the case where the percent defective is 2.0% for the parts $C_A$ and 1.0% for the part $C_B$, this means that 50 parts $C_A$ actually produced in one lot contain one defective part. Thus, to a first lot of 50 parts $C_A$, one part is added and as for a total of 51 parts $C_A$ the part production schedule is prepared. In the event that all of the 51 parts $C_A$ has passed the inspection, one extra stock occurs and addition of one part to the next lot of 50 parts $C_A$ is canceled.

The foregoing procedure is diagrammatically shown in FIG. 7. Numeral 51 in FIG. 7 denotes one part added to a schedule 52 essentially prepared for the production of a lot of 50 parts. After the production 53, all of the 51 parts has passed the inspection as collectively designated by 54, the schedule 52 is modified or revised as at 55 so that addition of one part 57 to the schedule is canceled and the next production schedule 56 will be executed with a normal lot of 50 parts.

Figure 4:
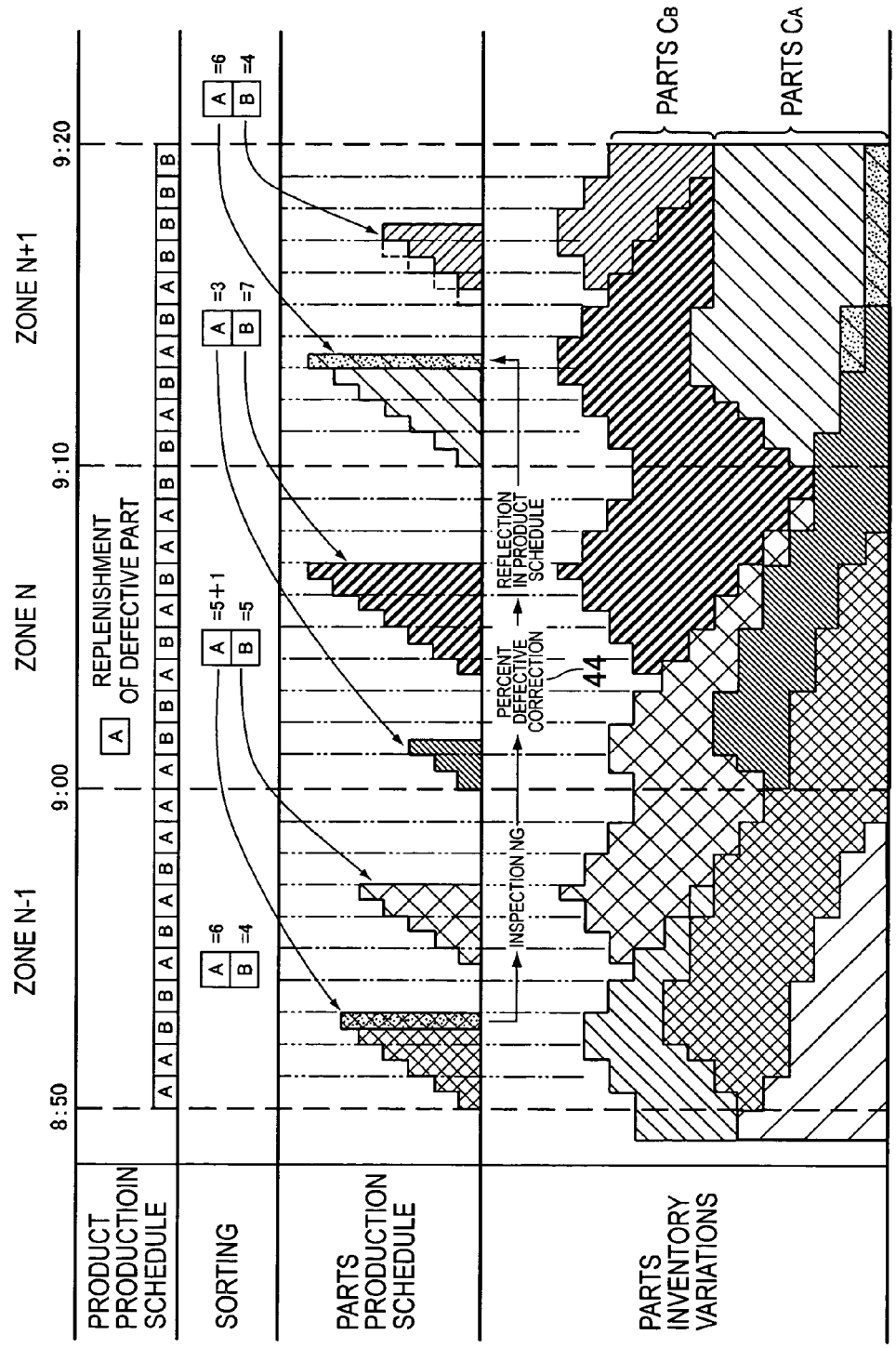
FIG. 4 is a view similar to FIG. 3, but showing a parts production scheduling method according to a second embodiment of the present invention.

Description will now be made to a parts production scheduling method according to a second embodiment shown in FIG. 4, wherein the same reference characters designate these parts already discussed with reference to FIG. 3. In the second embodiment, the part production schedule involves parts replenishment, which is achieved by revising the schedule upwardly as stated above with reference to FIG. 7. Stated more specifically, in the second embodiment, production of a part $C_A$ to be replenished is scheduled in zone N based on a percent defective and thereafter executed in the preceding zone N−1. After production, the produced and inspected parts in zone N−1 include one defective part. Since the parts production scheduling method in the second embodiment is essentially the same as the method of the first embodiment shown in FIG. 3, only a distinguishing feature of the second embodiment will be described.

The number of parts $C_A$ to be normally produced in zone N−1 is 5, which is equal to the number of type-A products to be produced in the next zone N. In the second embodiment, however, the part production schedule is prepared as involving parts replenishment effected at a rate of 1/50, which is determined by a percent defective of the parts $C_A$ recorded heretofore. Thus, one part is added to for production with five other parts in zone N−1. The parts produced in zone N−1 include one defective part and this causes a substantial increase in the percent defective of the parts $C_A$. Such increase in the percent defective is provided as information (step 44 shown in FIG. 4) and reflected appropriately in the preparation of a parts production schedule to be executed in zone N+1 so that the prepared part production schedule involves parts replenishment to correct the percent defective f the parts $C_A$.

According to the second embodiment of the inventive parts production scheduling method, the parts production schedule can be readily changed during the course of production of the parts as long as the condition represented by the Expression (1) is satisfied.

Figure 5:
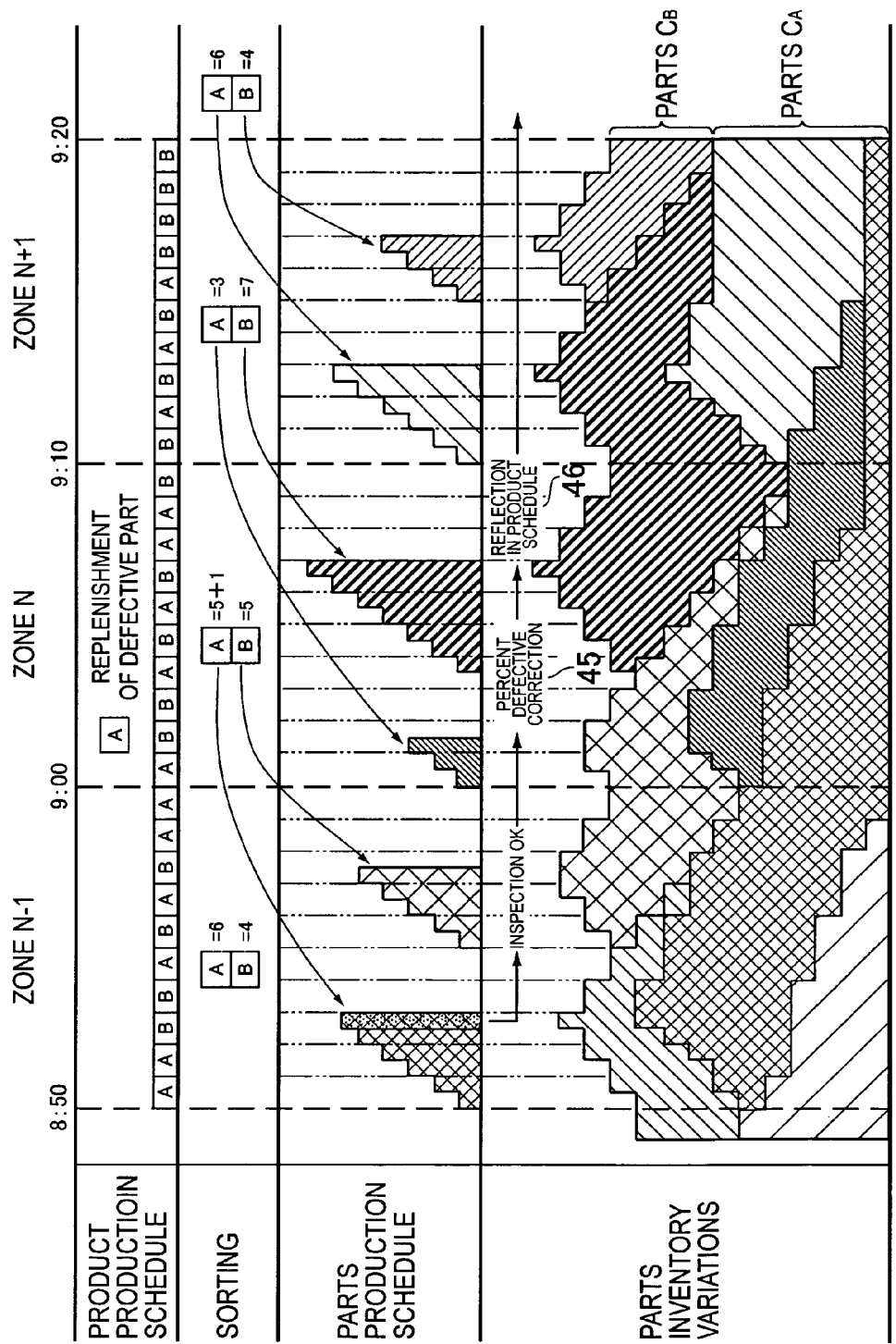
FIG. 5 is a view similar to FIG. 3, but showing a parts production scheduling method according to a third embodiment of the present invention.

FIG. 5 diagrammatically shows a parts production scheduling method according to a third embodiment of the present invention. In FIG. 5 the same reference characters designate these parts, which are identical to those already discussed with reference to FIG. 3. The third embodiment is a modification of the second embodiment shown in FIG. 4. Stated more specifically, in the third embodiment, production of a part $C_A$ for replenishment is scheduled in zone N based on a percent defective and executed in the preceding zone N−1. After production, all of the parts produced in zone N−1 have passed the inspection. Since the parts production scheduling method in the third embodiment is essentially the same as the method of the first embodiment shown in FIG. 3, only a distinguishing feature of the third embodiment will be described.

The number of parts $C_A$ to be normally produced in zone N−1 is 5, which is equal to the number of type-A products to be produced in the next zone N. In the third embodiment, however, the part production schedule is prepared as involving parts replenishment effected at a rate of 1/50, which is determined by a percent defective of the parts $C_A$ recorded heretofore. Thus, one part is added to for production with five other parts in zone N−1. All the produced parts $C_A$ including one added for replenishment in zone N−1 are non-defective. As a consequence, when assembly in zone N using the parts $C_A$ produced in zone N−1 have completed at 9:10, one part still remains unassembled. Accordingly, if the parts production schedule involving parts replenishment based on an estimated percent defective is further continued, an increased amount of extra parts stocks will be produced. To avoid this problem from occurring, the part production schedule involving parts replenishment is canceled in the manner as discussed above with reference to FIG. 7. Cancellation of the parts product schedule involves a step 45 of correcting the percent defective of the parts $C_A$ and a step 46 of reflecting the corrected percent defective in the production of parts in a subsequent stage.

Figure 6:
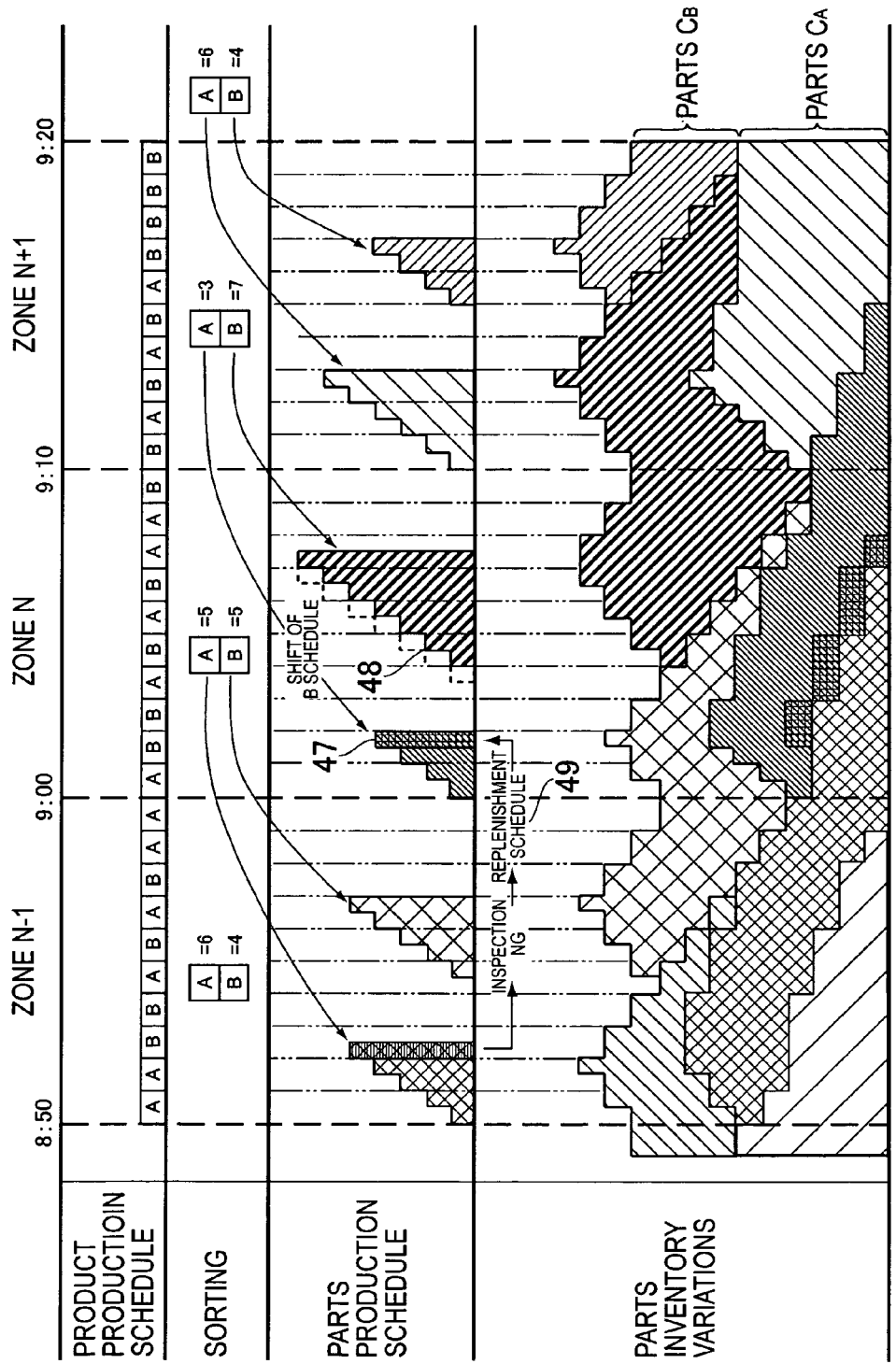
FIG. 6 is a view similar to FIG. 3, but showing a parts production scheduling method according to a fourth embodiment of the present invention.

FIG. 6 diagrammatically shows a parts production scheduling method according to a fourth embodiment of the present invention. In FIG. 6 the same reference characters designate these parts, which are identical to those already discussed with reference to FIG. 3. The fourth embodiment especially covers the case where a defective part occurs from among those parts produced according to the normal part production schedule. Stated more specifically, in the fourth embodiment shown in FIG. 6, the number of parts $C_A$ to be produced in zone N−1 for used in the next zone N is 5 but the parts actually produced in zone N−1 include one defective part. In this instance because the product production line in zone N needs 5 produced parts, a shortage of parts $C_A$ will occur on the product production line in zone N. Now assuming that there is no schedule to produce parts $C_A$ on the part production line in the next zone N, it becomes impossible to carry out the production of the type-A products due to lack of the parts $C_A$. To avoid this problem from occurring, an earliest one of the parts production schedules for the parts $C_A$, which comes first after the occurrence of the defective part, is so modified to include replenishment of the defective part.

In the fourth embodiment shown in FIG. 6, to those parts $C_A$ (three in number), which are normally scheduled for production in zone N, one part $C_A$ is added as at 47. With this one part addition, production of the part $C_B$ in the same zone N is shifted backward as at 48 so that the part production schedule in zone N is modified to meet the condition represented by Expression (1). This procedure is referred to as replenishment schedule as denoted by 49 in FIG. 6.

The fifth part $C_A$ produced in zone N−1 and evaluated as being defective is initially intended for use in assembly with the product (finished vehicle) at 9:08. The fourth part $C_A$ now produced in zone N can be used without trouble, as a replenishment of the defective part, in the assembly with the product achieved at 9:02.

In the fourth embodiment of the parts production scheduling method, if the replenishment parts production schedule for the parts $C_A$ cannot be reflected in the part production schedule in zone N due, for example, to failure to meet the condition of Expression (1), a part produced in zone N for use in assembly with the product in the next zone N+1 can be used ahead of schedule for assembly with the product in the same zone N.

In the first to the fourth embodiments described above with reference to FIGS. 3–6, the production order of the parts $C_A$ and $C_B$, which is determined after the sorting step, is fixed in the order named (i.e., $C_A \rightarrow C_B$). The fixed parts production order or sequence should not always be preferable for all cases. The embodiments described above have various features as specified below.

1. Average product assembly time in the preceding zone N-1:

| Type-A products: | 0 min., 1.0 min., 4.0 min., 6.0 min., 8.0 min., and 9.0 min. (Average: 4.67 min.) |
| Type-B products: | 2.0 min., 2.0 min., 5.0 min., and 7.0 min. (Average: 4.25 min.) |

2. Average product assembly time in zone N:

| Type-A products: | 0 min., 3.0 min., 5.0 min., 7.0 min., and 8.0 min. (Average: 4.6 min.) |
| Type-B products: | 1.0 min., 2.0 min., 4.0 min., 6.0 min., and 9.0 min. (Average: 4.4 min.) |

It appears clear from the foregoing that so far as the two zones N-1 and N are concerned, production of parts $C_A$, $C_B$ with a production order or sequence where the parts $C_B$ are scheduled ahead of the products $C_A$ is advantageous from the viewpoint of a float slack time.

However, in the zone N where the difference in average production time between the parts $C_A$ and the parts $C_B$ is small, production of the parts in a production sequence $C_A \rightarrow C_B$ is advantageous because the production sequence $C_A \rightarrow C_B$ in this zone N as used in combination with the production sequence $C_B \rightarrow C_A$ in the preceding zone N-1 can eliminate a setup change which would occur before production in zone N is started.

When applied to the production of a wide variety parts, the parts production scheduling method of the invention requires a complicated production order schedule. However, from limiting conditions for the parts production, in the case of the aforementioned embodiments, parts are classified into three groups I, II and III, as shown in FIG. 8, and in each parts group, the production sequence of the parts is set to be variable with the average assembly times of the respective products in the manner as discussed above. As for the production sequence between the parts groups I, II and III, it is preferable to arrange the parts production sequences in two adjacent zones such that a production sequence I→II→III is used in zone N-1 and a different production sequence III→II→I is employed in the next zone N. With this arrangement, a part production schedule with high flexibility can be prepared. In FIG. 8, a mark ⊚ is used to indicate a high similarity between two types of parts arranged in row and column due to low limiting conditions for production, a mark X is used to indicate a low similarity due to high limiting conditions for production, and a mark ○ is used to indicate a moderately high similarity.

Figure 9:
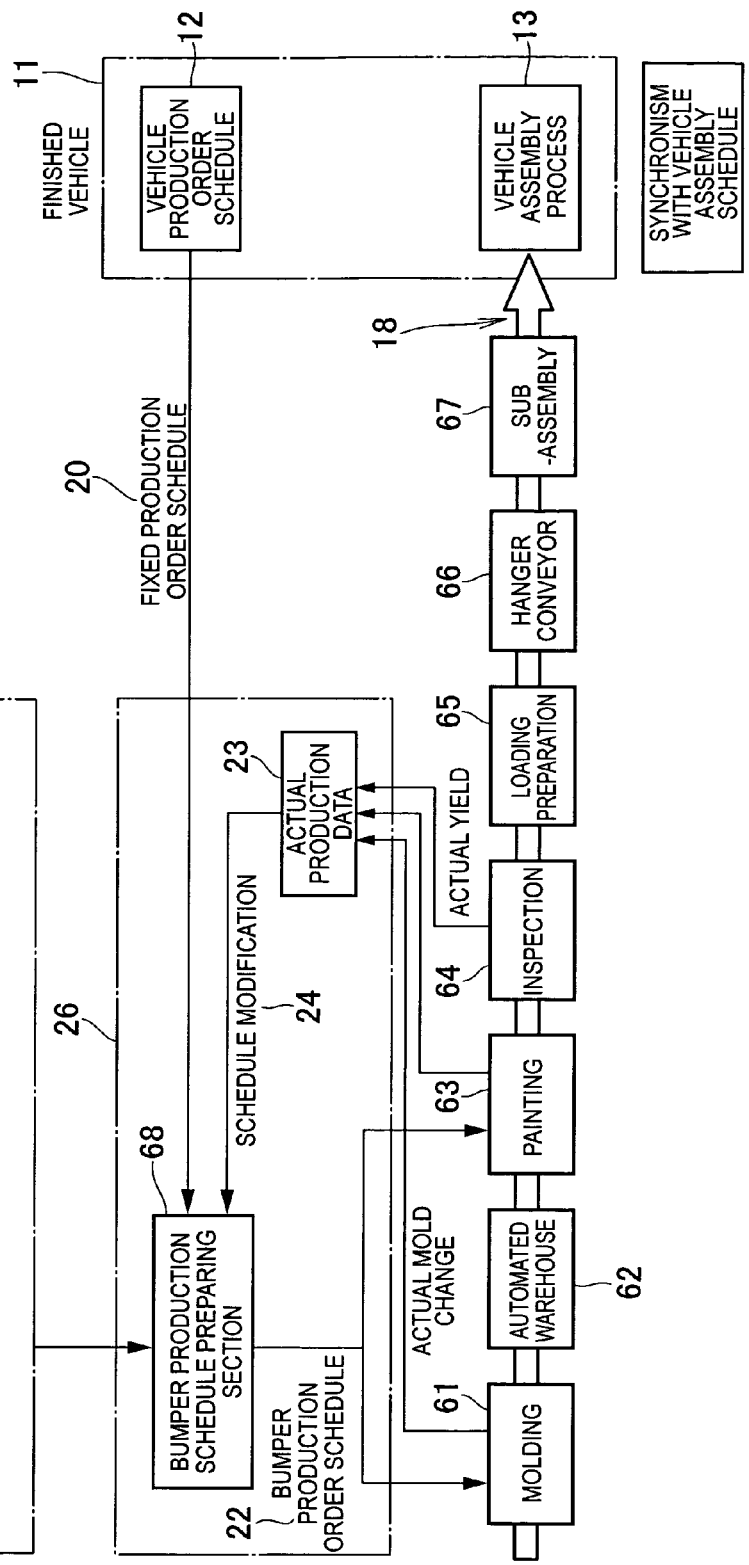
FIG. 9 is a block diagram showing a general configuration of a production system in which the parts production scheduling method of the invention is embodied in the production of automobile bumpers.
Figure 10:
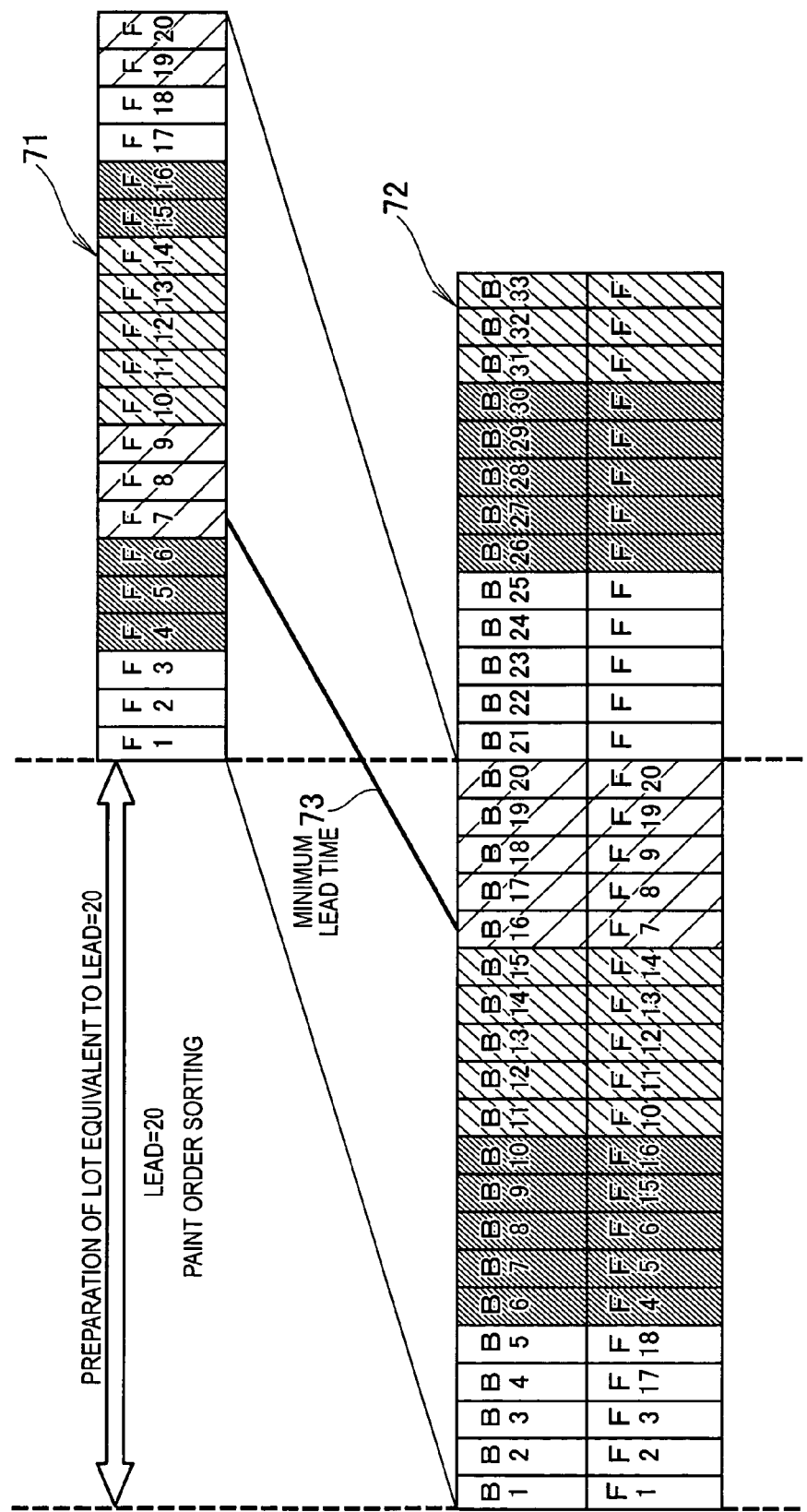
FIG. 10 is a view illustrative of the manner in which a bumper production schedule is prepared.

Referring next to FIGS. 9 through 12 inclusive, an automobile bumper production schedule embodying the part production scheduling method of the invention will be described later. FIG. 9 shows in block diagram a general configuration of a production system in which the automobile bumper production schedule is implemented. FIG. 10 is a detailed view of FIG. 2, showing dividing and sorting steps achieved in a schedule for assembling parts into motor vehicles. FIG. 11 is a flowchart showing a sequence of steps for carrying out the bumper production scheduling method, and FIG. 12 is a diagram showing the relationship between the width of lead and the lead time.

In FIG. 9 these parts, which are identical to those already discussed with reference to FIG. 1, are designated by the same reference characters and further description thereof will be omitted. Numeral 11 denotes a finished vehicle production area; 12, a vehicle production order schedule; 13, a vehicle assembly process; 13, a bumper production and delivery process; 26, a parts production control block in a parts (bumper) production area; 20, a fixed production order schedule; 22, a part (bumper) production order schedule; 23, actual production data; 24, schedule modification; and 25, a condition registering section.

The vehicle assembly process 13 includes a parts production line and to a line side of the parts production line, necessary kinds of parts (bumpers) are supplied in necessary amounts for subsequent assembly process achieved in the corresponding parts assembly sections. The bumper production and delivery profess 18 includes in succession a molding stage 61 in a molding section, an automated warehouse stage 62 in an automated warehouse, a painting stage 63 in a painting section, an inspection stage 64 in an inspection section, a loading preparation stage 65 in a loading preparation section, a hanger conveyor stage 66 in a hanger conveyor section, and a sub-assembly state 67 in a sub-assembly section. The parts production control block 26 for bumpers includes a bumper production schedule preparing section 68.

According to the bumper production schedule shown in FIG. 9, bumpers are molded from synthetic resin (molding stage 61), then temporarily stocked (automated warehouse stage 62), painted (painting stage 63) according to the higher vehicle production order schedule 12, and subsequently inspected (inspection stage 64). The inspected non-defective bumpers are supplied to the product production line (stages 65, 66 and 67). The bumpers are issued according to an assembly order of the finished motor vehicles.

FIG. 10 shows on its upper side a finished vehicle production order schedule 71. Upon receipt of information that a lead is equal to 20 vehicles, a first lot of 20 vehicles is separated from the finished vehicle production order schedule 71. The 20 vehicles in the separated lot are sorted by paint color of the bumpers with the results shown in a schedule 71 on the lower side in FIG. 10. In the schedule 72, the production priority for each color is separately determined based on the requirements for a painting apparatus. A bumper painting schedule for the leading 20 bumpers can thus be prepared.

As for colors shown in FIG. 10, a solid color represents "red", a fine-pitch upwardly-sloping hatching represents "black", a coarse-pitch upward-sloping hatching represents "blue", and a downwardly-sloping hatching represents "gray".

The foregoing procedure is repeated for each of succeeding lots of 20 vehicles on the basis of the finished vehicle production order schedule. When a bumper painting schedule prepared on the bases of the entire finished vehicle production order schedule completes, a computer data control has assigned to every bumper a frame number of one finished vehicle with which the bumper is to be assembled. In other words, bumpers and finished vehicles are correlated or tied one-on-one in advance, so that it is possible to calculate a loading lead time, which is a float slack time between the end of the bumper painting process and the beginning of the bumper loading preparation process. Among others, a line designated by 73 in FIG. 10 indicates a "minimum" lead time. The minimum lead time is the most important factor to be controlled because it affects the production of finished vehicle when a delay occurs due to some reasons. For the part having a relatively short float slack time (lead time), a warning may be issued.

The part production scheduling method of the invention will be described with reference to a flowchart shown in FIG. 11.

A first step S11 receives a production order schedule in a production schedule of higher products (finished vehicles in the illustrated embodiments). The production order schedule shows a scheduled production completion time of every higher product (finished vehicle). Then, a step S12 converts product-processing information of the higher products into parts-using-time information of the necessary parts. The part-using-time information is information about scheduled assembly times of the individual parts. Subsequently, a step S13 inserts single-item orders from single-item arrangement information into the schedule. Thereafter, a step S14 receives lead information and divides a necessary-parts order schedule. Subsequently, a step S15 sorts a lot by using parts similarity information. Then, a step S16 adds a shortfall to the schedule based on yield information. A step S17 prepares a production order schedule in such a manner that the condition represented by Expression (1) is satisfied. Subsequently, a step 18 takes in the lead information again and places the lead repeatedly within a predetermined rang. Then, a step S19 determines as to whether the obtained lead satisfies a predetermined condition. If the determination result is negative (NO), the procedure returns to step S14. Alternatively, the determination result is affirmative (YES), the procedure does on to the next step S20 where an optimum lead is determined based on the lead and a lead time. Then, a step ST21 determines a production order of the parts. Finally, a step 22 delivers a lower production schedule.

Description will now be made to the relationship between the lead and the lead time with reference to FIG. 12. In FIG. 12, the horizontal axis represents the lead, and the vertical axis represents the lead time. As for the horizontal axis, numeral 81 designates a particular width or range of leads. Now, evaluation of the lead times is possible through a study of the lead times with respective to the parts having different leads falling within the range 81. Once the parts are completed, the standing time before each part is subjected to assembly with the mating product increases with an increase in the lead time. On the other hand, as the lead time becomes shorter, the risk becomes higher. Thus, the difference between the longest lead time and the shortest lead time should preferably be as small as possible. From this point of view, the lead time designated by 82 in FIG. 12 is evaluated as being optimum.

Referring next to FIGS. 13 to 16 and FIGS. 17A and 17B, a description will be given of a tying control, which performs tying between the bumpers (parts) to be produced and the finished vehicles according to the automobile bumper production scheduling method of the invention described above. The tying control is defined as a control of the correlation or matching between each individual part produced on the part production line and a corresponding one finished product subsequently produced on the product production line.

FIG. 13 exemplifies a finished vehicle production schedule chart 91 at certain times of a given day. A finished vehicle production order or sequence shown in this chart 91 is determined by customer needs and hence is variable. As for the type of vehicles, the production proceeds in the order beginning from "Accord Wagon", followed by "Accord". As for Accord Wagon, the production proceeds in the order beginning from "4WD" followed by "2WD". As for the destination of the Accord Wagon 4WD model, the production proceeds in the order of "Domestic", "Export RH" and "Export LH". As to the color (exterior painting color" of the Accord Wagon, 4WD, Domestic model, the production proceed in the order beginning from "Red", followed by "Black". Frame numbers F01–F60 are given to identify individual finished vehicles.

When the production order schedule for 60 vehicles with frame numbers F01–F60 shown in the chart 91 of FIG. 13 is received from a higher schedule, preparation of a bumper production schedule begins. Assuming that a lead in the bumper production process is set to be 20, the finished vehicle production schedule chart 91 for 60 vehicles is divided by 20 into three zones having frame numbers F01–F20, F21–F40 and F41–F60, respectively. Then, parts codes indicative of types of bumpers corresponding to the vehicles of frame numbers F01–F20 are determined to identify types of bumpers to be produced.

For such parts code determination, a chart 92 shown in FIG. 14 is used. The chart 92 is registered in advance and shows various combinations of the type, specification, destination and color of all of the vehicles that can be produced in the finished vehicle production plant, and the parts code indicative of the type of a bumper that is used in combination with the corresponding vehicle. In the illustrated embodiment, the bumper has 16 types. As for the part code, first two letters are used to indicate variations in shape and configuration, which include three different types "AA", "AB" and "AC". The last two letters of the parts code are used to indicate color variations, which include "Red", "Black", "Blue" and "Silver" available for all of the "AA", "AB" and "AC" type bumpers, and "Green" and "White" available only for the "AC" type bumper.

By collating the type, specification, destination and color of each individual vehicle shown in the chart 91 of FIG. 13 with the parts code of one of the bumpers shown in the chart 92 of FIG. 14 corresponding to the type, specification, destination and color of the vehicle, it is possible to find out a parts code of the bumper corresponding to each respective frame number. For example, the frame number F01 shown in the chart 91 of FIG. 13 represents a vehicle of "Accord Wagon" type, "4WD" specification, "Domestic" destination, "Red" color model. Thus, by collating the chart 92 of FIG. 14, we can reach the parts code "AA-RE", which identifies one bumper that is to be used in combination with the vehicle with frame number "F01". Similarly, a vehicle with frame number "F11" representing "Accord Wagon", "4WD", "Export LH", "Blue" model corresponds to a bumper with parts code "AA-BL". With respect to the type, specification, destination and color of all of the vehicles with frame numbers F01–F20, the aforementioned collating operation is achieved to thereby collect all of the bumpers necessary for the production of the vehicles with frame numbers F01–F20.

Further description will be made to the similarity in production of bumpers with reference to a chart shown in FIG. 17A. In FIG. 17A, mark ⊚ indicates high similarity; ○, presence of similarity; and X, lack of similarity. Is appears clear from FIG. 17A that bumpers of the shapes "AA" and "AB" do not cause any problem even when they are produced in a mixed condition, however, each of the "AA" and "AB" shape bumpers is preferably produced collectively. On the other hand, bumpers of the shape "AC", due to lack of similarity, are unfavorable for the mixed production with "AA" or "AB" shape bumpers. The "AC" shape bumpers should preferably be produced either before or after the production of "AA" or "AB" shape bumpers. Thus, the chart shown in FIG. 17A provides a definition that the "AC" shape bumpers should not be produced in a mixed condition with the "AA" or "AB" shape bumpers. This definition can be confirmed by a chart entitled "Shape Priority", such as shown in FIG. 17B. Thus, the production order that should be taken when bumpers chosen for production have all bumper shapes "AA", "AB" and "AC" is previously set from the viewpoint of production efficiency.

FIG. 17B also shows three charts entitled "Color Priority Pattern A", "Color Priority Pattern B" and "Color Priority Pattern C", respectively. These charts provide preferable color priority patters that are determined in advance in view of the facility requirements for painting of the bumpers. It appears clear from these charts that painting performed in the order of "Red", "Black", "Blue" and "Silver" or in the reverse order of "Solver", "Blue", "Black" and "Red" is preferable from the efficiency point of view. These orders may change depending on the shape of bumpers.

Based on a lineup of necessary bumpers for the production of vehicles with frame numbers F01–F20, a level of the similarity between the necessary bumpers, and a color priority pattern for painting, a sequence or order of production of the bumpers, which is represented by the parts codes, is determined. An example of such bumper production order schedule is shown in FIG. 16. In accordance with the production order, a bumper serial number (S/N) is assigned to each of the bumpers, which increases in order of production of the bumpers. Since the parts codes are determined by calculation using the charts 91 and 92 (FIGS. 13 and 14, respectively), the bumper serial number and the frame number can be tied with each other, as seen from a chart shown in FIG. 6.

Figure 15:
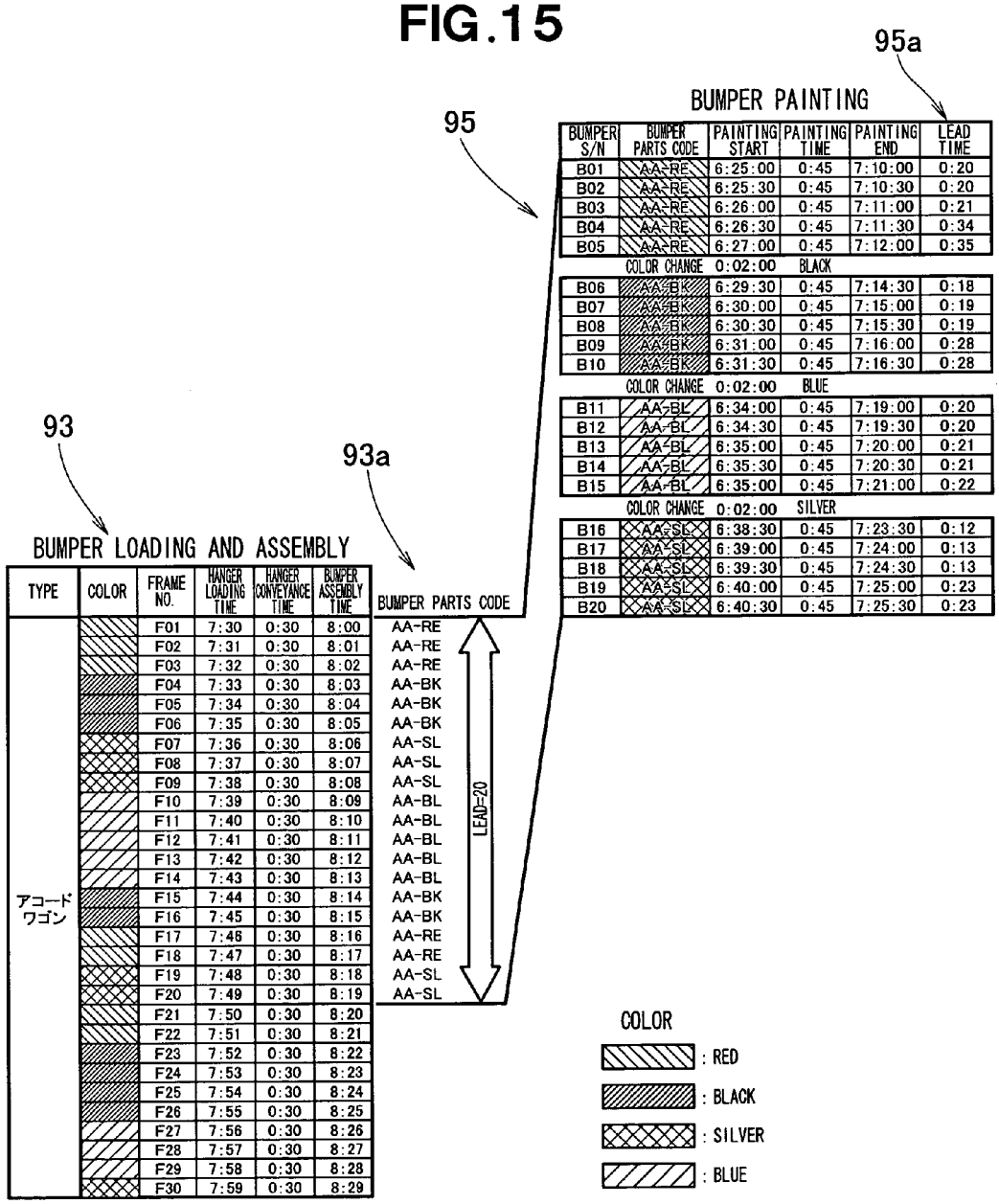
FIG. 15 is a chart showing the relationship between the bumper loading and assembly process on the product production line and the bumper painting process on the parts production line.
Figure 20:
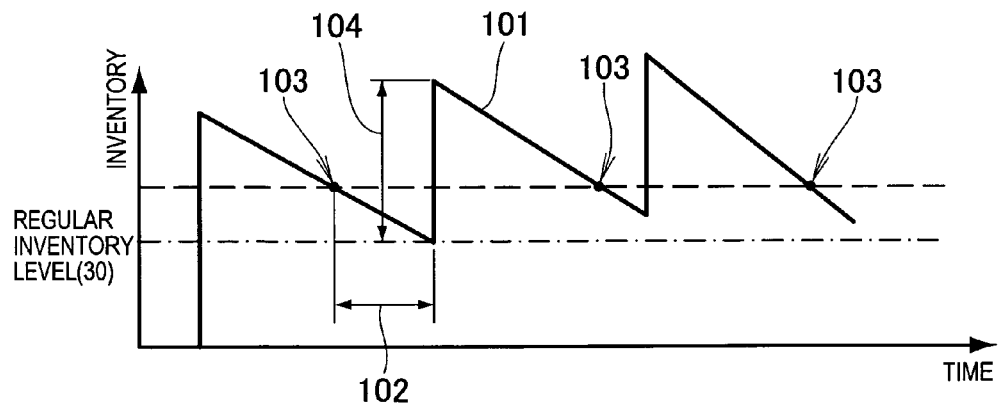
FIG. 20 is a graphical representation of a change in the inventory quantity in response to a supply of parts according to a conventional "kanban" system.
Figure 21:
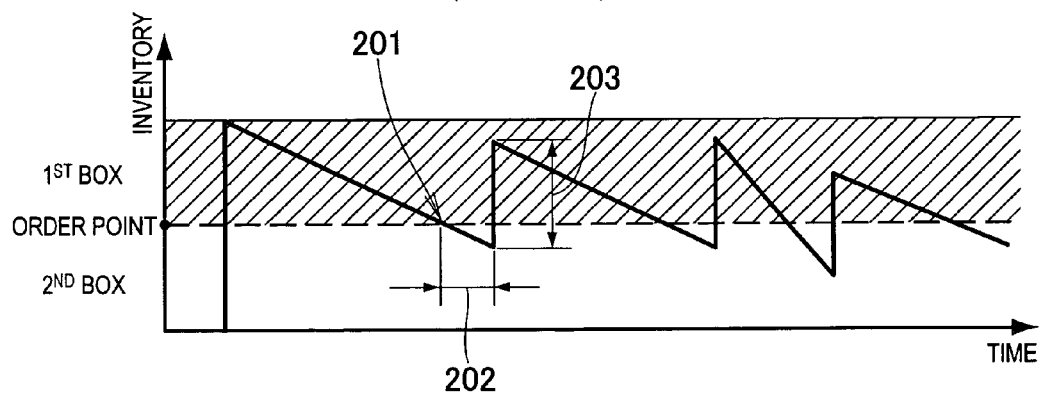
FIG. 21 is a graphical representation of a change in the inventory quantity in response to a supply of parts according to a conventional parts production schedule preparing method.
Figure 22:
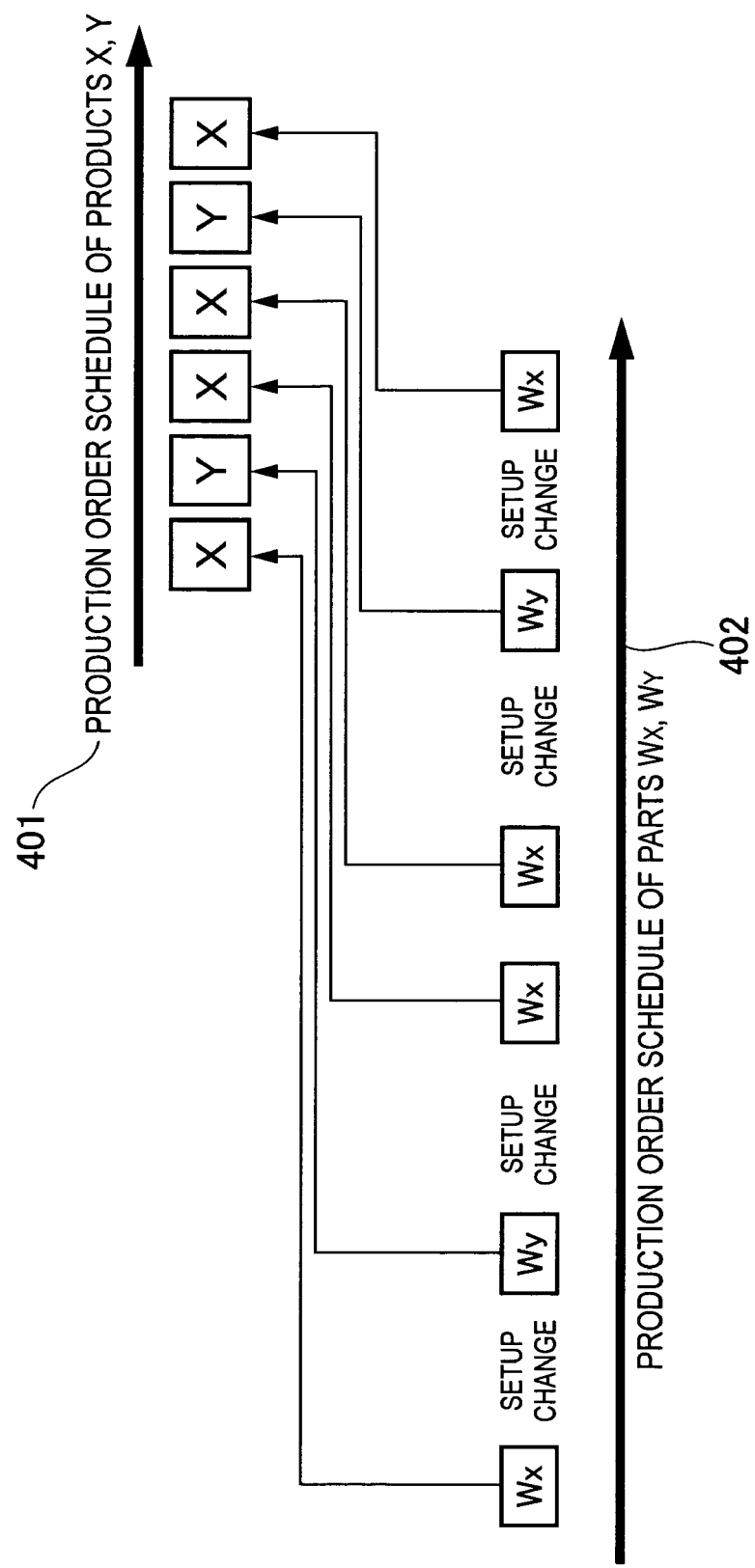
FIG. 22 is a chart showing the relationship between a product production order schedule and a parts production order schedule according to a conventional production scheduling method.

The correlation between the bumper serial number and the frame number will be described with reference to FIG. 15 while taking the actual production time into consideration. A chart segment designated by 93 shows in simplified form the content of the vehicle production order schedule shown in the chart 91 of FIG. 13. As appears clear from the chart segment 93, the bumper assembly process is scheduled to run through a time period from 8:00 to 8:19 so as to assemble 20 bumpers into the vehicles of frame numbers F01–F20, 20 at an assembling rate of one for each minute. The bumpers are delivered from the bumper production process to the bumper assembly process by means of a hanger conveyor. Since the hanger conveyor requires 30 minutes for such delivery, the 20 bumpers scheduled for assembly with the vehicles with frame numbers F01–F20 should be placed or loaded one for each minute on the hanger conveyor during a time period from 7:10 to 7:49; if not so, they will be late for the production of the F01–F20 frame-number vehicles.

Now considering a schedule which completes production of 20 bumpers as a lead before the vehicle with frame number F01 is loaded on the hanger conveyor. Since the hanger loading time of the bumper, which corresponds to the vehicle with frame number F01 and hence is loaded first on the hanger conveyor among from the 20 bumpers, is 7:30, painting of all the 20 bumpers should complete before 7:29. In other words, the 20 bumpers constituting a lead should be paint-finished during a period of 7:10 to 7:29 and ready for loading on the hanger conveyor.

Starting from 20 bumpers forming the lead, respective parts codes of the bumpers are drawn on from the vehicle specifications using the chart 91 shown in FIG. 13. The result is shown in a chart segment 93a shown in FIG. 15. Then, while making reference to the predetermined inter-parts similarity shown in FIG. 17A and the predetermined color priority patterns shown in FIG. 17B and so on, the production priority across the different parts codes is determined with the result that a bumper production order or sequence, such as enumerated in a chart segment 95 shown in FIG. 15 is determined. In the order thus determined, serial numbers B01 to B20 peculiar to bumpers are assigned to the 20 bumpers.

The bumper painting process requires a painting takt time (parts takt time) of 30 seconds and a color change time (setup time) of 2 minutes. The number of types of the 20 bumpers is four (4), and the condition represented by Expression (1) is satisfied, as evidenced below.

$$20\times(1.0\ min.) \geq 20\times(0.5\ min.) + 4\times(2.0\ min.) = 18$$

The bumper painting process, starting with application of a paint to each individual bumper and ended with complete drying of the applied paint, requires 45 minutes. Thus, as for the bumper having bumper number B01, the painting process is scheduled to begin at 6:25, which is 45 minutes ahead of 7:10. From bumper serial number B01 to bumper number B05, the same parts code "AA-RE" is arrayed consecutively. Thus a red paint is continuously used and the painting apparatus does not require a halt for color changing. However, at the bumper serial number AA-BK color is changed from red to black, so that the painting apparatus should make a halt for 2 minutes for color change operation (including cleaning of painting nozzles) before painting of a black paint begins. After the color change operation, painting of the B06 bumper is started. The same operation is needed also when the paint color is changed to blue or silver. The painting process requires 45 minutes so that the bumper with serial number B01 is paint-finished at 7:10 and the bumper with serial number B20 is paint-finished at 7:25:30, as seen from the chart segment 95 shown in FIG. 15.

Since the bumper serial numbers and the vehicle frame numbers are tie-controlled as shown in FIG. 16, it is readily possible to calculate a time from completion of each bumper to loading of the same bumper on the hanger conveyor. The results of calculation of the time are shown the chart segment 95 of FIG. 15, column "lead time" denoted by 95a. Among the 20 bumpers, the B16 bumper has a minimum lead time (12 minutes), which means that a float slack (standing time) between completion to loading of the bumper to the hanger conveyor is minimum. The production process of this B16 bumper is severely controlled so as to determine whether the production process proceeds as scheduled or not. As long as the lead time of the B16 bumper is maintained, parts shortage does never occur even when no stock parts is provided.

Referring next to FIGS. 18 and 19, the relationship between the vehicle production order schedule 12 and the parts production order schedule 22 shown in FIGS. 1 and 2 will be discussed in further detail. As shown in FIGS. 18 and 19, the vehicle production order schedule 12 is composed of two vehicle production order schedules 12A and 12B each prepared for a corresponding one of two product production lines. On the other hand, the parts production order schedule 22 is prepared for only one parts production line. In the illustrated embodiment, the two (first and second) product production lines are supplied with parts from the single parts production line.

In the embodiment shown in FIG. 18, in connection with the supply of parts from the single parts production line to the first and second product production lines, production and sorting of the parts come before the production of the products in such a manner that the produced and sorted parts can be supplied separately to the first and second product production lines. The product production lines operate on two shifts and the production of the Nth day is divided into two shifts (first shift 1S and second shift 2S). During a first half of the second shaft on the (N−1)th day, the part production line produces necessary parts collectively for use with the products produced by the first shift of the first product production line on the Nth day. On the other hand, during a second half of the second shaft on the (N−1)th day, the part production line produces necessary parts collectively for use with the products produced by the first shift of the second product production line on the Nth day. Similarly, during a first half of first shaft on the Nth day, the part production line produces necessary parts collectively for use with the products produced by the second shift of the first product production line on the Nth day. On the other hand, during a second half of the first shaft on the Nth day, the part production line produces necessary parts collectively for use with the products produced by the second shift of the second product production line on the Nth day. As for the production of the two product production lines on the subsequent days, the parts production line performs collective production of the parts in the same manner as described above.

In the embodiment shown in FIG. 19, in connection with the supply of parts from the single parts production line to the first and second product and the production of the Nth day is divided into two shifts (first shift 1S and second shift 2S). During the second shaft on the (N−1)th day, the part production line produces necessary parts collectively and simultaneously for use with the products produced by the first shift of the first and second product production lines on the Nth day. Similarly, during a first shaft on the Nth day, the part production line produces necessary parts collectively and simultaneously for use with the products produced by the second shift of the first and second product production lines on the Nth day. As for the production of the two product production lines on the subsequent days, the parts production line performs collective simultaneous production of the parts in the same manner as described above.

Obviously, various minor changes and modifications of the present invention are possible in the light of the above teaching. It is therefore to be understood that within the scope of the appended claims the invention may be practiced otherwise than as specifically described.

What is claimed is:

1. A parts production scheduling method for preparing a production order schedule of parts necessary for the production of higher products after receipt of a production order schedule of the higher products, comprising the steps of:
   pre-registering parts identification information, inter-parts similarity information, and part-by-part production order pattern information;
   dividing the production order schedule of the parts into plural zones each equivalent to production of a predetermined number of consecutive products in the product order schedule of the higher products;
   shifting the production order schedule of the parts so that the production order schedule of the parts is ahead of the production order schedule of the higher products by one zone;
   for each zone of the production order schedule of the parts, converting parts to be produced on a parts production line into corresponding pieces of information of the pre-registered parts identification information; and
   for each zone of the production order schedule of the parts, sorting the converted pieces of parts identification information by the pre-registered inter-parts similarity information and collating the converted pieces of parts identification information with the pre-registered part-by-part production order pattern information.

2. The parts production scheduling method as recited in claim 1, the predetermined number of products is represented by a numeric value variable within a predetermined range and set in advance as representing a lead of the production order schedule of the parts relative to the production order schedule of the higher products.

3. The parts production scheduling method as recited in claim 2, further comprising the step of correcting the numeric value on the basis of actual production data collected on the parts production line.

4. The parts production scheduling method as recited in claim 1, further comprising the step of upwardly revising the production order schedule of the parts on the basis of actual percent defective information collected for each type of parts.

5. The parts production scheduling method as recited in claim 1, further comprising the step of revising a production schedule of each type of parts on the basis of actual production data about production-scheduled parts or expected defective parts.

6. The parts production scheduling method as recited in claim 1, wherein the production order schedule of the parts is applicable to a production order schedule of parts to be ordered on a type-by-type basis in conjunction with the production order schedule of the higher products.

7. The parts production scheduling method as recited in claim 1, wherein the production order schedule of the parts is so prepared as to satisfy the condition represented by Expression:

$$Z \times (\text{product takt time}) \geq Z \times (\text{parts takt time}) + M \times (\text{setup time})$$

where Z represents the number of higher products in each of the divided zones, and M represents the number of types of the parts sorted in each of the divided zones.

8. The parts production scheduling method as recited in claim 1, further comprising the step of calculating, on the basis of the production order schedule of the parts, a float slack time between the end of production of each part and the beginning of assembly of the same part into a corresponding one of the higher products and issuing a warning with respect to a part having a relatively short float slack time.

9. The parts production scheduling method as recited in claim 1, wherein the part production line is linked in operation with at least two product production lines such that the part production line produces, in a first half of each of the divided zones, those parts to be used with higher products produced on one of the at least two product production lines, and in a second half of the same divided zone, those parts to be used with higher products produced on another product production line.

10. The parts production scheduling method as recited in claim 1, wherein the part production line is linked in operation with at least two product production lines such that the part production line produces, in each of the divided zones, first parts and second parts in a mixed condition, for use with first higher products and second higher products, respectively, produced on one of the at least two product production lines and second higher products produced on another product production line.

* * * * *